United States Patent
Vigneau et al.

(10) Patent No.: US 11,921,696 B1
(45) Date of Patent: *Mar. 5, 2024

(54) AUTOMATIC FEEDBACK LOOP FOR INCREMENTAL DATA SET PROCESSING

(71) Applicant: Rocket Mortgage, LLC, Detroit, MI (US)

(72) Inventors: Kavita Vigneau, Farmington Hills, MI (US); Jonathan Osment, Plymouth, MI (US); Evan Richard Moran, Madison Heights, MI (US); Zachary Jordan Rosenthal, Royal Oak, MI (US); Ryan Endres, Mesa, AZ (US)

(73) Assignee: Rocket Mortgage, LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,242

(22) Filed: Nov. 4, 2022

Related U.S. Application Data

(63) Continuation of application No. 16/931,235, filed on Jul. 16, 2020, now Pat. No. 11,494,365.

(Continued)

(51) Int. Cl.
*G06F 16/00* (2019.01)
*G06F 16/23* (2019.01)
*G06F 16/28* (2019.01)

(52) U.S. Cl.
CPC ...... *G06F 16/2358* (2019.01); *G06F 16/2365* (2019.01); *G06F 16/285* (2019.01)

(58) Field of Classification Search
CPC .... G06F 18/24; G06F 18/256; G06F 11/0739; G06F 11/0763; G06F 11/0766; G06F 11/079; G06F 11/0793; G06F 11/14; G06F 11/2023; G06F 11/2058; G06F 11/2094; G06F 13/385; G06F 13/4027; G06F 16/2365; G06F 17/10; G06F 17/11; G06F 11/3688; G06F 16/2379; G06F 11/1446; G06F 11/3034; G06F 11/3447; G06F 17/175; G06F 3/064; G06F 3/0653; G06F 1/00; G06F 3/00; G06F 5/00; G06F 7/00; G06F 8/00; G06F 9/00; G06F 11/00;

(Continued)

(56) References Cited

U.S. PATENT DOCUMENTS

| | | | |
|---|---|---|---|
| 2006/0208885 A1* | 9/2006 | Lin ........................ | G06Q 10/087 340/572.1 |
| 2006/0208887 A1* | 9/2006 | Fields .................... | G06Q 10/08 340/572.1 |
| 2021/0208545 A1* | 7/2021 | Zhang .................... | G06N 5/04 |

* cited by examiner

*Primary Examiner* — Shyue Jiunn Hwa
(74) *Attorney, Agent, or Firm* — Kilpatrick Townsend & Stockton LLP

(57) ABSTRACT

A method of updating a data set using event-based conditions includes adding a first data point to the data set and triggering a first event indicating that the data set has changed. Adding the first data point to the data set triggers the first event. The method also includes, in response to the first event, updating conditions for completing the data set. The conditions are associated with action pathways for receiving or verifying missing data points in the data set. The method further includes triggering a second event indicating that the conditions for completing the data set have changed and, in response to the second event, distributing the conditions to a plurality of distributed services. Each of the plurality of distributed services is configured to execute one or more of the action pathways for receiving or verifying the missing data points in the data set.

20 Claims, 18 Drawing Sheets

Related U.S. Application Data

(60) Provisional application No. 63/052,430, filed on Jul. 15, 2020.

(58) Field of Classification Search
CPC .......... G06F 12/00; G06F 13/00; G06F 15/00; G06F 16/00; G06F 17/00; G06F 18/00; G06F 21/00; G06F 30/00
See application file for complete search history.

AUTOMATIC FEEDBACK LOOP FOR INCREMENTAL DATA SET PROCESSING

CROSS-REFERENCES TO RELATED APPLICATIONS

This application is a continuation of U.S. application Ser. No. 16/931,235, filed on Jul. 16, 2020, entitled "AUTOMATIC FEEDBACK LOOP FOR INCREMENTAL DATA SET PROCESSING", the disclosure of which is incorporated by reference herein in its entirety. U.S. application Ser. No. 16/931,235 claims the benefit of U.S. Provisional No. 63/052,430 filed on Jul. 15, 2020 entitled "AUTOMATIC FEEDBACK LOOP FOR INCREMENTAL DATA SET PROCESSING," which is incorporated herein by reference in its entirety.

TECHNOLOGY AREA

This disclosure generally relates to network technologies for incrementally populating data sets. This disclosure specifically relates to an event-listener architecture with a continual feedback loop that operates to determine the most efficient action pathways for distributed services to populate, verify, and qualify missing data points from a data set.

BACKGROUND

Many different applications may solicit large amounts of information through a client device in order to populate a data set. Traditionally, these applications have either used a single large user interface that collects all of the data in a single session, or have used a series of progressive web forms that incrementally populate the data set as it is received. However, both of these previous solutions rely on a set of static interfaces that are often inefficient in retrieving the required information for the data set. These prior solutions are also error-prone and do not provide multiple action pathways for retrieving data from sources that provide high confidence scores for validating data set values. Therefore, improvements in this technology are needed.

BRIEF SUMMARY

In some embodiments, a method of updating data sets using event-based conditions may include adding a first data point to a data set and triggering a first event indicating that the data set has changed. Adding the first data point to the data set may trigger the first event. The method may also include, in response to the first event, updating one or more conditions for completing the data set. The one or more conditions may be associated with a plurality of action pathways for receiving or verifying missing data points in the data set. The method may additionally include triggering a second event indicating that the one or more conditions for completing the data set have changed. The method may further include, in response to the second event, distributing the one or more conditions to a plurality of distributed services. Each of the plurality of distributed services may be configured to execute one or more of the action pathways for receiving or verifying the missing data points in the data set.

In some embodiments, a non-transitory computer-readable medium may include instructions that, when executed by one or more processors, cause the one or more processors to perform operations including adding a first data point to a data set, and triggering a first event indicating that the data set has changed. Adding the first data point to the data set may trigger the first event. The operations may also include, in response to the first event, updating one or more conditions for completing the data set. The one or more conditions may be associated with a plurality of action pathways for receiving or verifying missing data points in the data set. The operations may additionally include triggering a second event indicating that the one or more conditions for completing the data set have changed. The operations may further include, in response to the second event, distributing the one or more conditions to a plurality of distributed services. Each of the plurality of distributed services may be configured to execute one or more of the action pathways for receiving or verifying the missing data points in the data set.

In some embodiments, a system may include one or more processors and one or more memories that may include instructions that, when executed by the one or more processors, cause the one or more processors to perform operations including adding a first data point to a data set, and triggering a first event indicating that the data set has changed. Adding the first data point to the data set may trigger the first event. The operations may also include, in response to the first event, updating one or more conditions for completing the data set. The one or more conditions may be associated with a plurality of action pathways for receiving or verifying missing data points in the data set. The operations may additionally include triggering a second event indicating that the one or more conditions for completing the data set have changed. The operations may further include, in response to the second event, distributing the one or more conditions to a plurality of distributed services. Each of the plurality of distributed services may be configured to execute one or more of the action pathways for receiving or verifying the missing data points in the data set.

In any embodiments, any of the following features may be included in any combination and without limitation. The method/operations may also include receiving the first data point from an external data service through a web interface. The method/operations may also include receiving the first data point through a user interface that is generated by a distributed service that is assigned to the first data point in the data set. The one or more conditions may be based at least in part on a set of data set requirements that are associated with a resource. The resource may be selected based on a completed portion of the data set before the data set is fully completed. The data set may be subdivided into a plurality of data groups, and each data group in the plurality of data groups is assigned to a corresponding distributed service in the plurality of distributed services. Each of the plurality of data groups may be stored locally by the corresponding distributed service in the plurality of distributed services such that the data set is distributed among the plurality of distributed services. The method/operations may also include sending a request through a data aggregation layer to the plurality of distributed services for the plurality of data groups; and receiving the plurality of data groups from the plurality of distributed services and assembling the data set from the plurality of data groups. An indication of a corresponding source may be stored for each data point in the data set. The method/operations may also include generating a second data point in the data set using a qualification calculator that performs an operation using a plurality of data points in the data set as operands. The first data point may be added to the data set by a first distributed service in the plurality of distributed services. The first event may be generated by the first distributed service. A condition service may receive the first event, update the one or more conditions, and generate the second event. The method/ operations may also include receiving the second event by a second distributed service in the plurality of distributed services; executing an action pathway associated with the one or more conditions; adding a second data point to the data set; and generating another instance of the first event indicating that the data set has changed. The method/operations may also include registering a first distributed service with a condition service using a standardized interface between the condition service and the plurality of distributed services such that the first distributed service is added to the plurality of distributed services. Portions of the one or more conditions may be generated by the plurality of distributed services and combined to form the one or more conditions. The one or more conditions may be associated with one or more resolvers that include logical operations to determine whether the one or more conditions have been fulfilled. The first data point may be extracted from a document file uploaded from a client device.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
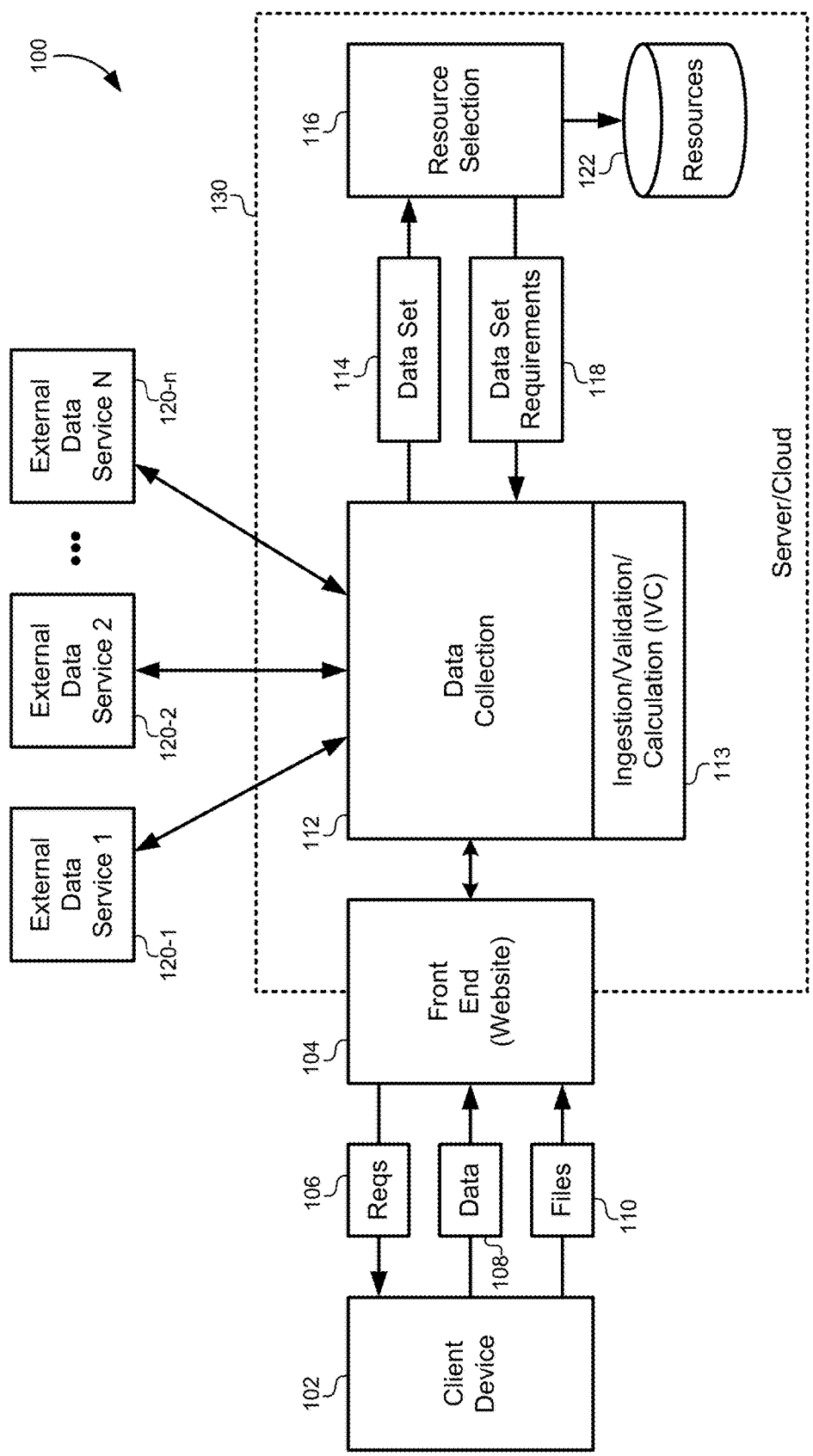
FIG. 1 illustrates a simplified block diagram of a system for incrementally completing partial data sets, according to some embodiments.

FIG. 1 illustrates a simplified block diagram 100 of a system 130 for incrementally completing partial data sets, according to some embodiments. The system 130 may be implemented in a cloud computing environment with a publicly accessible front end 104. The front end 104 may be implemented using a website, a web service, a mobile app, or any other client-device-facing interface. Alternatively, the system 130 may be implemented using an on-premise server that hosts applications and network interfaces. Examples of hardware and software that may be used to implement the system 130 are described below in FIG. 17 and FIG. 18.

The front end 104 may provide a web form or other interface that provides fields that may be populated by the client device 102. In some cases, the front end 104 may provide one or more requests 106 to the client device 102. These requests may be presented as progressive web forms or "interview-style" questions that incrementally present the requests 106 for information to the client device 102 such that the information may be provided incrementally to the client device 102 by a user. In some cases, a user may enter data 108 that is responsive to the requests 106 directly into the client device 102. In other cases, a user may provide information to a professional who then enters the data 108 into the client device 102 for the user.

In addition to providing data 108 to the client device 102, the user may also provide additional information, such as documents or files 110. These files may include scans of physical copies of documents that are provided by the user. In some instances, the user may provide the files 110 to a professional who then enters data from the files 110 into the client device 102 as individual data fields. Information from the files that is entered manually into the client device 102 may be stored collectively as a file 110 or may be stored separately as data 108 represented by individual data points. The client device 102 may upload the data 108 and/or files 110 to the front end 104 of the system 130.

Instead of receiving a completed data set all at once, data may be received incrementally through the front end 104 to begin populating a data set 114 that is specific to the user. The data set may include any type of information and may be used for any type of process involving the user. A data collection system 112 may coordinate receiving data points for the data set 114 from the front end 104. The data collection system 112 may also coordinate receiving data points for the data set 114 from a plurality of external data services 120. The external data services 120 may include any web service or publicly available API or interface that may provide information about the user. The data collection system 112 may cause requests to be submitted to any of the plurality of external data services 120 to receive data points that may be used to populate the data set 114. For example, the data collection system 112 may submit a request to a data service 120-1 that provides verified employment information for the user. The request may include an identification number for the user and/or other identifying information. The external data service 120-1 may respond with one or more data points that are descriptive of the employment information for the user. These data points may be added to the data set 114. A technical advantage of using the external data services 120 is that information received from these services 120 may be considered verified with a high degree of confidence. As described below, each of data points in the data set 114 may be associated with a source, and the sources may be used to generate a confidence score for each of the data points. The confidence score may inherently be set very high when a data point is received from one of the data services 120, such that additional validation of the data point may not be necessary. This allows actions to be removed from action pathways in the data collection system 112, thereby freeing the distributed processes within the data collection system 112 for other processing needs and reducing the overall processing burden on the data collection system 112.

When a form or file 110 is received through the front end 104 and/or from the external data services 120, the file 110 may be passed to an Ingestion, Validation, and Calculation engine (IVC) 113. The IVC 113 may be configured to analyze the file 110 using computer vision or optical character recognition (OCR) algorithms to extract identifying information in the file 110 used to identify the file 110 itself. The identifying information in the file 110 may be used to validate the authenticity of the file 110. The IVC 113 may also extract data points in the file 110 that are related to the user. The data points extracted from the file 110 may include numerical or text values that are associated with the user. These data points may be added to the data set 114. As described below, the IVC 113 may include a secure document storage that stores a scanned copy of the file 110 in association with a user account.

The system 130 may be configured to complete a data set for any type of application. By way of example, the system 130 of FIG. 1 may collect a data set for the purpose of selecting a particular resource from a plurality of resources and assigning the selected resource to the user. As the data set 114 begins to be populated with user information, a portion of the incomplete data set 114 may be submitted to a resource selection engine 116. The resource selection engine 116 may be configured to analyze a plurality of resources 122 and select a resource based on the partial information in the data set 114.

The resource selection engine 116 may select a particular resource for the user and may return a set of data set requirements 118. The data set requirements 118 may represent values that are required in the data set 114 in order for the resource to be assigned to the user. For example, the data set requirements 118 may indicate specific data points that are required for the data set 114. The data set requirements 118 may also indicate sources for the specific data points that are required in order for the associated data point to be considered verified at an acceptable confidence level. Additionally, the data set requirements 118 may specify criteria for the data point values in the data set 114. For example, the criteria may include thresholds, minimum values, maximum values, value ranges, and/or other value requirements that may be required in order for the selected resource to be assigned to the user. In some embodiments, the system 130 may also impose additional requirements that are incorporated into the data set requirements 118 in addition to those requirements received from the resource selection engine 116.

The data collection system 112 may begin by collecting general information for the user until a specific resource is selected. Afterwards, the data set requirements 118 for the selected resource may drive the actions taken by the data collection system 112 such that the data set 114 is populated with data points that are required for that particular resource. This allows the data collection system 112 to focus only on specific data points that are required for a selected resource rather than collecting data points that are not necessary for the resource to be assigned to the user. This improves the data collection system 112 by streamlining the data collection process and minimizes the bandwidth required for each user interfacing with the data collection system 112.

Figure 2:
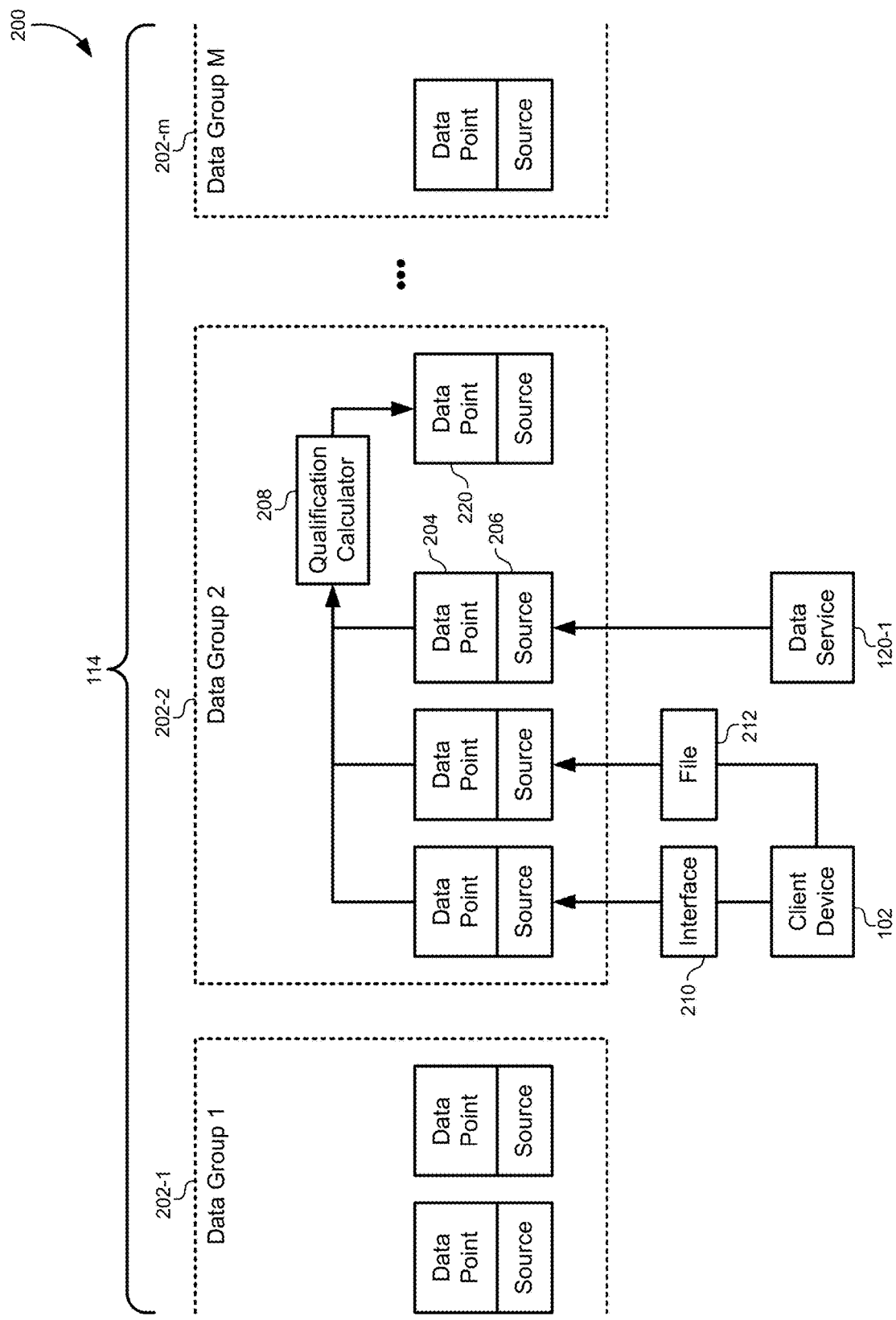
FIG. 2 illustrates a simplified diagram of the data set where the data points may be grouped according to a set of distributed data collection services in the data collection system, according to some embodiments.

FIG. 2 illustrates a simplified diagram 200 of the data set 114 where the data points may be grouped according to a set of distributed data collection services in the data collection system 112, according to some embodiments. As described in detail below, the data collection system 112 described herein may distribute the collection, validation, storage, and processing of the data set 114 into a plurality of individual data group services described in detail with FIG. 4 below. The distribution of these data group services may be based on subdivisions made in the data set 114 itself. For example, the data set 114 may be subdivided into a plurality of data groups 202. Each of the data groups 202 may correspond to a specific data group service that is configured to collect, validate, store, and/or process each of the data points in the corresponding data group.

For example, data group 202-2 may correspond to a specific data group service. The data group service may be configured to provide a user interface 210 that is specifically configured to present requests to the client device 102 and receive data points from the client device 102 to populate the data group 202-2. The corresponding data group service may also be configured to receive files from the client device 102 that are processed by the IVC 113 described above. Data from the interface 210 and/or data points extracted from a file 212 may be stored as individual data points in the data group 202-2. Additionally, the data group 202-2 may include data points that are received from one of the external data services 120-1. Receiving the data points from each of these different data sources may be managed and coordinated by the corresponding data group service.

Each of the data points in the data groups 202 may include a value for the data point as well as a source for the data point. Many of the data set requirements 118 from FIG. 1 may impose types of validation that may be required for any value provided as a data point. For example, a data point entered through a user interface may require a document or file to be submitted in order to verify that the value of that data point is correct. Some data points may require multiple sources in order for the data point to be validated. Indications of different sources may be stored along with the data points. For example, a data point 204 may be associated with a specific source 206 in the data set 114.

Although not illustrated specifically in FIG. 2, data points may also be associated with a calculated confidence score for the data point. Each source type may contribute to a confidence score for the data point. For example, a data point provided from the external data services 120 may generate a very high confidence score (e.g., 100%), while a data point provided from a user through the interface 210 may generate a relatively low confidence score until the data point is verified by one or more additional sources that generate higher confidence scores.

In some embodiments, data points may be generated internally by the data collection system 112 using qualification calculators, or "qualifiers." One or more data points provided from external sources may be used to mathematically or logically generate additional data points in the data group. For example, two data points in data group 202-1 may be combined using a qualification calculator 208 to generate a separate data point 220 that represents a mathematical ratio between the two data points.

Figure 3:
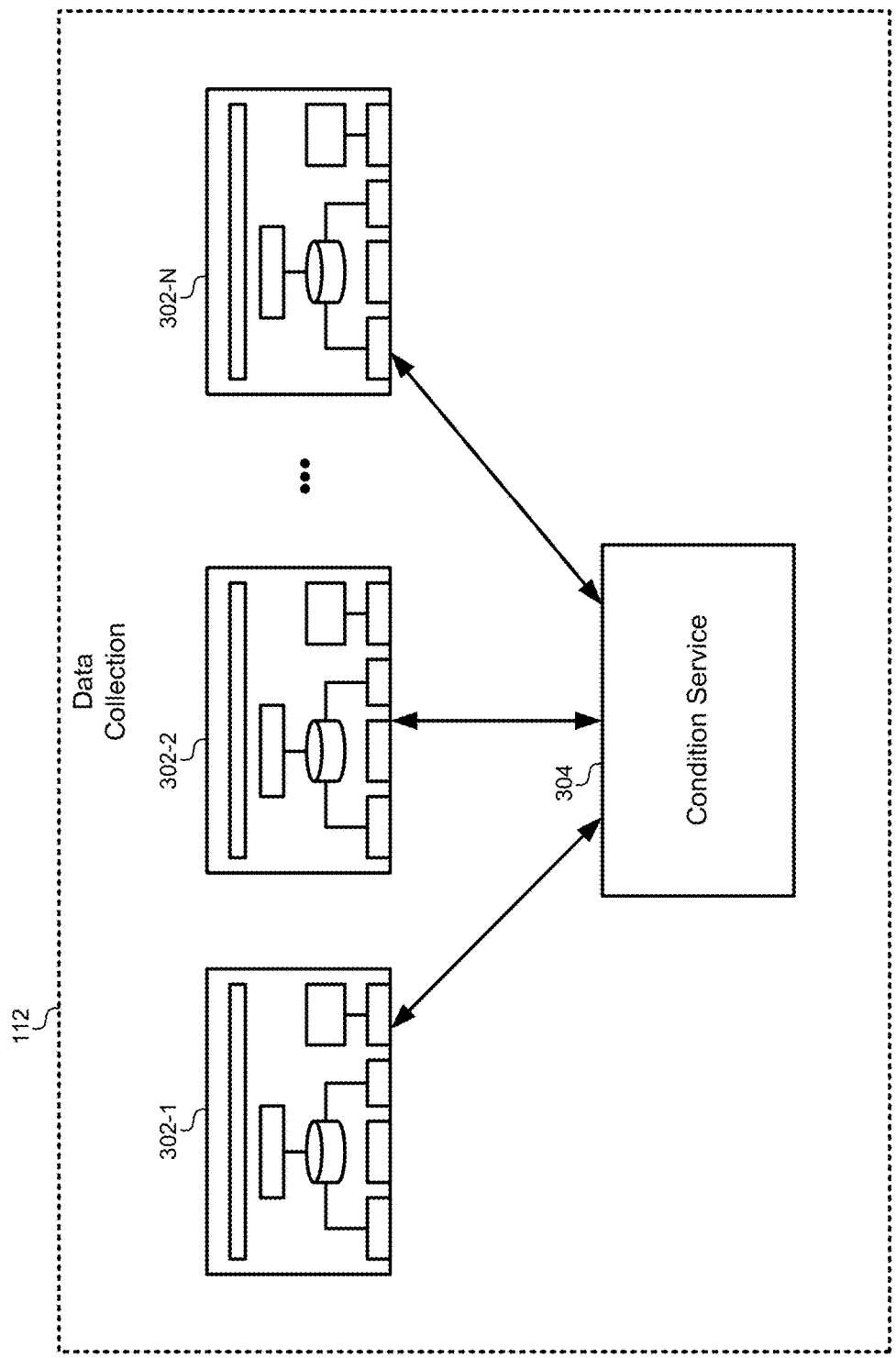
FIG. 3 illustrates a simplified diagram of data group services that are distributed within the data collection system and coordinated using a condition service, according to some embodiments.

FIG. 3 illustrates a simplified diagram 300 of data group services that are distributed within the data collection system 112 and coordinated using a condition service 304, according to some embodiments. The data collection system 112 may be comprised of a number of distributed data group services 302. Each of the distributed data group services 302 may be associated with one of the data groups from the data set 114 described above in FIG. 2. For example, each of the data group services 302 may operate as a service in a cloud and/or containerized environment. Each of the data group services 302 may include an interface that allows a condition service 304 to coordinate the activities of the data group services 302. Although each of the data group services 302 and the condition service 304 may communicate in a number of different ways, including directly calling endpoint services, the examples described herein use an event-listener architecture to coordinate the processing of the data set 114.

The core update loop between the data group services 302 and the condition service 304 serves to iteratively populate the data set with the data points in order to fulfill the data set requirements 118 described in FIG. 1. This update loop will be described in detail throughout the remainder of this disclosure and may be summarized as follows. Each of the data group services 302 may be configured to provide an interface to the front end and/or to an external data service in order to request/receive data points for the data set 114. The data set 114 may be distributed such that each data group in the data set 114 is stored at the corresponding data group service responsible for populating that data group in the data set 114. When a data group service updates its data group in the data set, an event may be triggered indicating that the data set 114 has changed. The condition service 304 may listen for this first event indicating that the data set 114 has changed in order to generate a new set of conditions or update an existing set of conditions that provide action pathways for populating the remainder of the data set 114. If the set of conditions stored at the condition service 304 changes, a second event may be executed indicating that the set of conditions has changed. The data group services 302 may each listen for this second event type and update and execute the action pathways that are embodied in the conditions in order to continue populating the data set. As the action pathways are executed by the data group services, the data set will continue to change, and the loop will continue to iterate until all the conditions have been resolved and the data set is complete.

This distributed architecture for receiving, validating, storing, and processing a data set incrementally solves a number of technical problems and improves the functioning of the data collection system 112 in a number of different ways. First, the processing, storage, and verification of each data group may be distributed to the data group services that are optimized to handle that specific type of data. This compartmentalizes different data groups such that all of the information regarding that data group is stored and processed in a single, distributed service in the data collection system 112. This allows data groups to be freely added to and removed from the data set without limitation. New data group services corresponding to new data groups may be registered with the condition service 304 at any time. This also allows the condition service 304 to operate using a standard interface that can be implemented by each of the data group services and to remain agnostic to the functionality implemented by the data group services. Upgrading a particular data group service can be isolated to a single module that is unlikely to affect other modules, thereby isolating errors and upgrade defects to a single data group service rather than affecting multiple services in the system. The event-listener architecture also optimizes how conditions are generated, distributed, and implemented by the different data group services in the system 130. Specifically, the data collection system 112 is optimized by distributing processing tasks for the data set to data group services that are specialized for handling each data group within the data set. In other words, new action pathways can be directed to the specific data group services that execute those action pathways, while data group services that are unaffected by changes to the data set need not interrupt or alter the execution of their existing action pathways.

Figure 4:
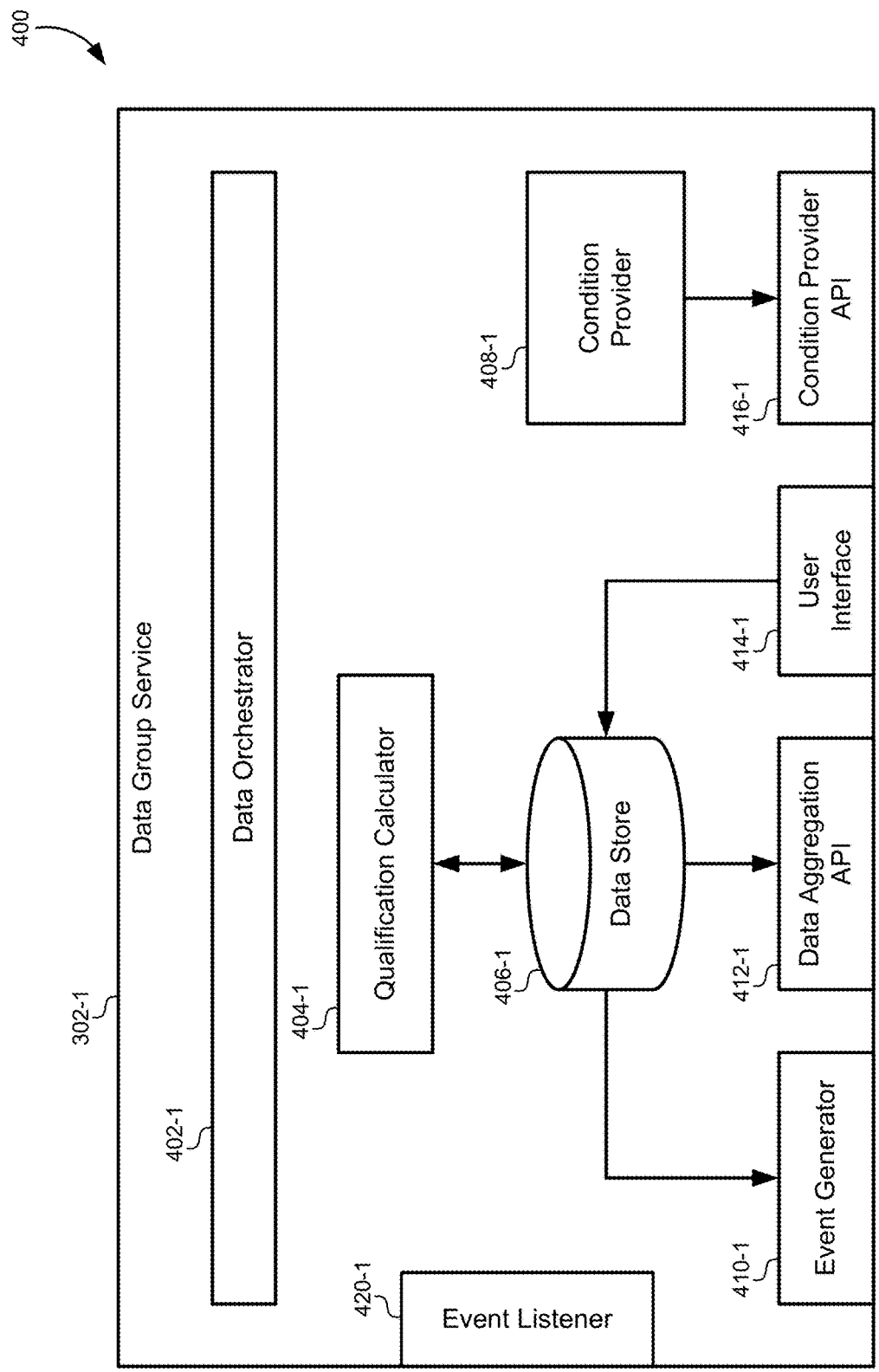
FIG. 4 illustrates a simplified block diagram of a data group service, according to some embodiments.

FIG. 4 illustrates a simplified block diagram 400 of a data group service 302-1, according to some embodiments. The data group service 302-1 may include a data orchestrator 402-1 that is configured to automate and coordinate multiple subsystems within the data group service 302-1. Specifically, conditions that are generated by the condition service 304 may include one or more action pathways that define specific actions that may be taken by the data group service 302-1 to collect and validate one or more data points in the data group assigned to the data group service 302-1. The other components illustrated in FIG. 4 may be coordinated using the data orchestrator 402-1.

The data group service 302-1 may include a data store 406-1 that stores the data group 202-1 that is associated with the data group service 302-1. The data store 406-1 may be implemented using a local distributed data store that is separate and distinct from other data stores in other data group services in the data collection system 112. The data store 406-1 may be accessible through a data aggregation API 412-1 that allows other services in the data collection system 112 to retrieve the data points stored in the data store 406-1 for this corresponding data group 202-1. As described below, the data aggregation API 412-1 may be used with the data aggregation APIs in the other data groups services to provide the entire data set to the condition service 304 when needed. The data store 406-1 may be coupled to a qualification calculator 404-1 that may be configured to qualify and/or generate data points for the data store 406-1 as described above.

The data group service 302-1 may also include an event generator 410-1. The event generator 410-1 may be configured to generate a first type of event that indicates that one or more data points stored in the data store 406-1 have changed. In some embodiments, the event generator 410-1 may generate and broadcast an event object that simply indicates that a change to the local portion of the data set 114 has taken place. In other embodiments, the event object may also include values for the changed data points and/or an indication of which specific data points have changed. This may be used by the condition service 304 and/or other services listening for this first type of event such that they can determine whether the change to the specific data points require action on their part.

The data group service 302-1 may also include a user interface 414-1 that can be displayed on the front-end 104 described in FIG. 1. The user interface 414-1 may be configured to present requests and retrieve specific data points related to the corresponding data group 202-1. For example, the user interface 414-1 may include web forms, questions, document-upload utilities, and other user interface components that are specifically tailored to retrieve data points in the data group 202-1. Distributing the user interface functionality to the various data group services 302 improves the system 130 by allowing each data group service to tailor the user interface experience specifically to retrieve the corresponding data points without affecting the user interface experience related to other types of data points.

The data group service 302-1 may also include a condition provider 408-1 and a condition provider API 416-1. As described in greater detail below, the condition providers 408 may be distributed to each data group service 302. Instead of centrally storing all of the logic and utilities for generating conditions based on rules provided by the data set requirements 118 for each specific data group in the data set, this executable code may be distributed to each data group service 302-1. This provides the advantage of tying the conditions for receiving, validating, and qualifying data points to the specific data group service configured to handle those data points. This allows the code to be modularized and distributed to improve the overall architecture of the system 130. When generating a new set of conditions or updating an existing set of conditions, the condition service 304 may send the data set 114 or a portion of the data set 114 to the condition provider API 416-1 to retrieve a portion of the conditions from the condition provider 408-1 for this particular data group service 302-1. Each of the conditions for each of the data groups may be combined to form the overall set of conditions managed by the condition service 304.

The data group service 302-1 may also include an event listener 420-1. The event listener may listen for a second type of event described above indicating that the set of conditions managed by the condition service 304 has changed. Event objects that are broadcasted by the condition service 304 and detected by the event listener 420-1 may include a new or updated set of conditions. The data orchestrator 402-1 may parse the conditions provided through the event listener 420-1 and determine if any of the action pathways described in the conditions have changed that pertain to the data group service 302-1. Any new action pathways may be implemented as a set of tasks or actions that are managed by the data orchestrator 402-1.

Figure 5:
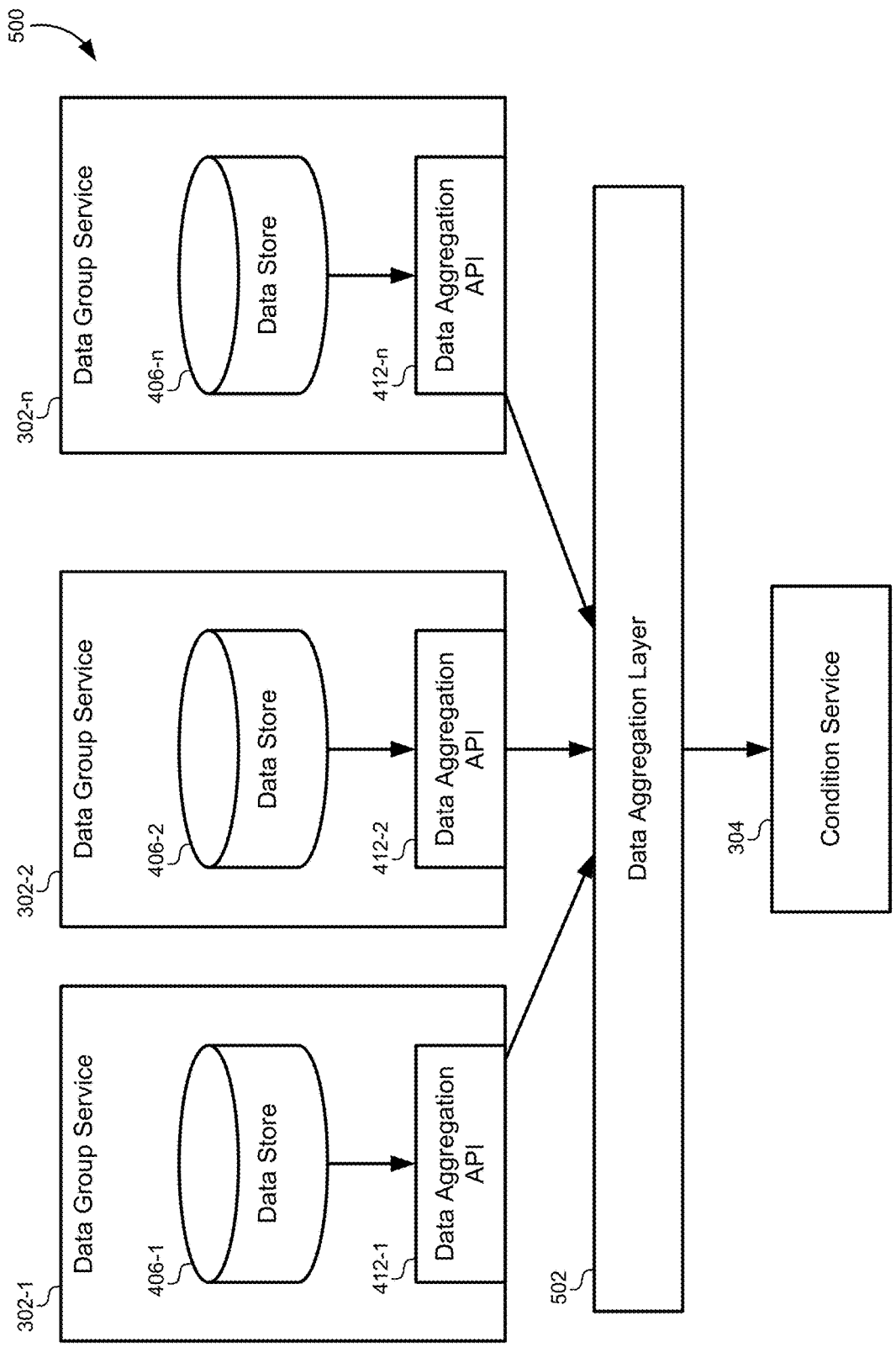
FIG. 5 illustrates a simplified block diagram of a distributed data set storage system, according to some embodiments.

FIG. 5 illustrates a simplified block diagram 500 of a distributed data set storage system, according to some embodiments. As described above in FIG. 4, each of the data group services 302 may include a local distributed data store that may be made available through data aggregation APIs. Instead of centrally storing the entire data set 114 for the user in one location, the data collection system 112 may instead store the data 114 set in the local distributed data stores. This improves the functioning of the data collection system 112 by allowing each of the data group services to use local function calls to access their assigned data points. Without the distributed data system described herein, each of the data group services would instead make calls to a central database or other storage systems, which would require longer latency and would require load balancing the calls from a number of different data group services.

While each of the data group services 302 may be configured to store all of the data points needed to perform their functions locally, the condition service 304 may benefit from having access to the entire data set 114. When any of the data group services 302 changes a data point in the data set 114, that data group service may trigger the first type of event indicating that the data set 114 has changed. When the condition service 304 receives the event, this may trigger a reprocessing of the current conditions for completing the data set 114 in accordance with the data set requirements 118. To reprocess the current conditions, the conditioning service 304 may send a request through the data aggregation layer 502 to each of the data aggregation APIs 412 to retrieve each of the individual data groups stored locally at the data group services 302. As each of the data group services 302 provides their corresponding data groups, the data aggregation layer 502 may combine the data groups into a single unified data set 114 that is presented to the condition service 304. This provides the benefit of using a distributed data storage system that is transparent to the condition service 304 when it needs the entire data set 114.

Figure 6:
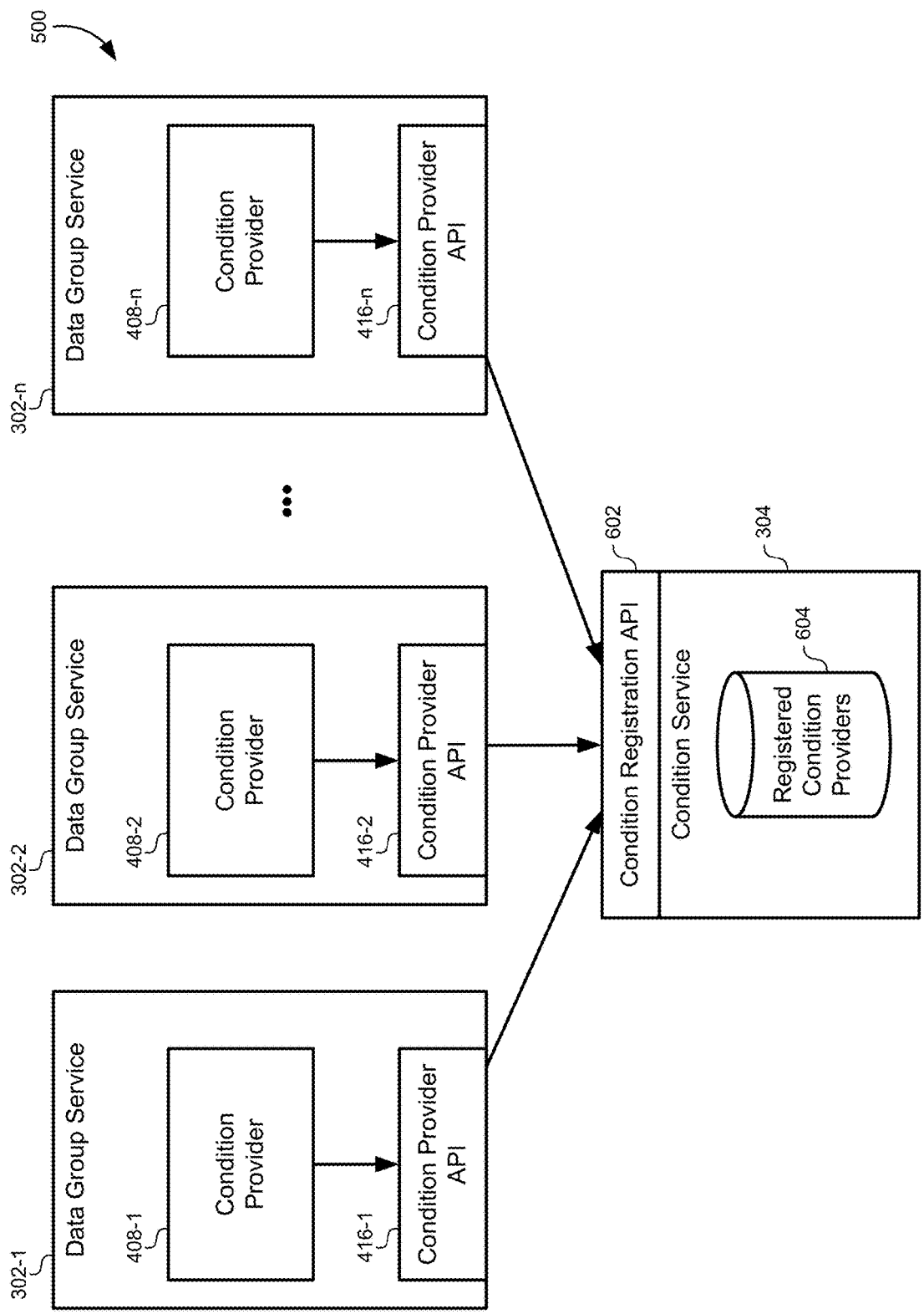
FIG. 6 illustrates a distributed system for generating conditions for completing the data set, according to some embodiments.

FIG. 6 illustrates a distributed system for generating conditions for completing the data set 114, according to some embodiments. As described above for the distributed data storage system, the utilities for generating conditions for completing the data set 114 may also be distributed to the different data group services 302. Generally, the "conditions" described herein refer to specific conditions that should be met in order to complete the data set 114 in accordance with the data set requirements 118. When a specific resource is selected for the user, the data set requirements 118 may require that specific data points should be acquired, that the data points should be verified using specific source options, and that the values in those data points should meet a certain value threshold. The "conditions" generated by the condition service 304 represent each individual condition that must be satisfied to complete data set 114. Additionally, each condition may include one or more action pathways that may be executed in order to satisfy the corresponding condition. Each action pathway may include one or more actions that may be taken by one of the data group services 302 to acquire a particular data point from a particular source and qualify that data point such that the data set requirements 118 are met.

Instead of centrally storing and maintaining the executable logic for determining the conditions for each state of the data set 114 as a whole, the condition service 304 may pass responsibility for generating conditions to each of the data group services 302. Specifically, the condition providers 408 in the data group services 302 may be configured to generate conditions having action pathways to satisfy those conditions for the data points assigned to that data group service. For example, rules may be provided with the data set requirements 118 for a specific data point that is managed and processed by a specific data group service 302-1. The condition provider 408-1 may include conditional logic that implements a number of "if-then" statements for meeting the data set requirements 118 for that specific data point.

The conditions for meeting one of the requirements in the data set requirements 118 may include multiple action pathways. In other words, the conditions for collecting, validating, and qualifying a data point may include a plurality of different action pathways that may be taken by different data group services 302 in order to populate the data point correctly. Therefore, conditions generated by one data group service 302-1 may include action pathways to be executed by another data group service 302-2. The condition service 304 manages the complete set of conditions and generates an event that is received by each of the data group services 302. Each of the data group services 302 can then parse the conditions for any action pathways that should be executed by that particular data group service.

By distributing the data set storage and the condition providers 408, the condition service 304 can operate as a plug-and-play central manager of the different data group services. Data group services can be added or removed freely by registering and de-registering the data group services with the condition service 304. The condition service 304 may include a registration API 602 that allows new data group services 302 to be registered with the condition service. An endpoint for each of the condition service APIs may be stored in a data store 604 at the condition service 304. When the condition service 304 begins operation, the endpoints for the data group services 302 that are registered with the condition service 304 may be loaded from the data store 604.

Figure 7:
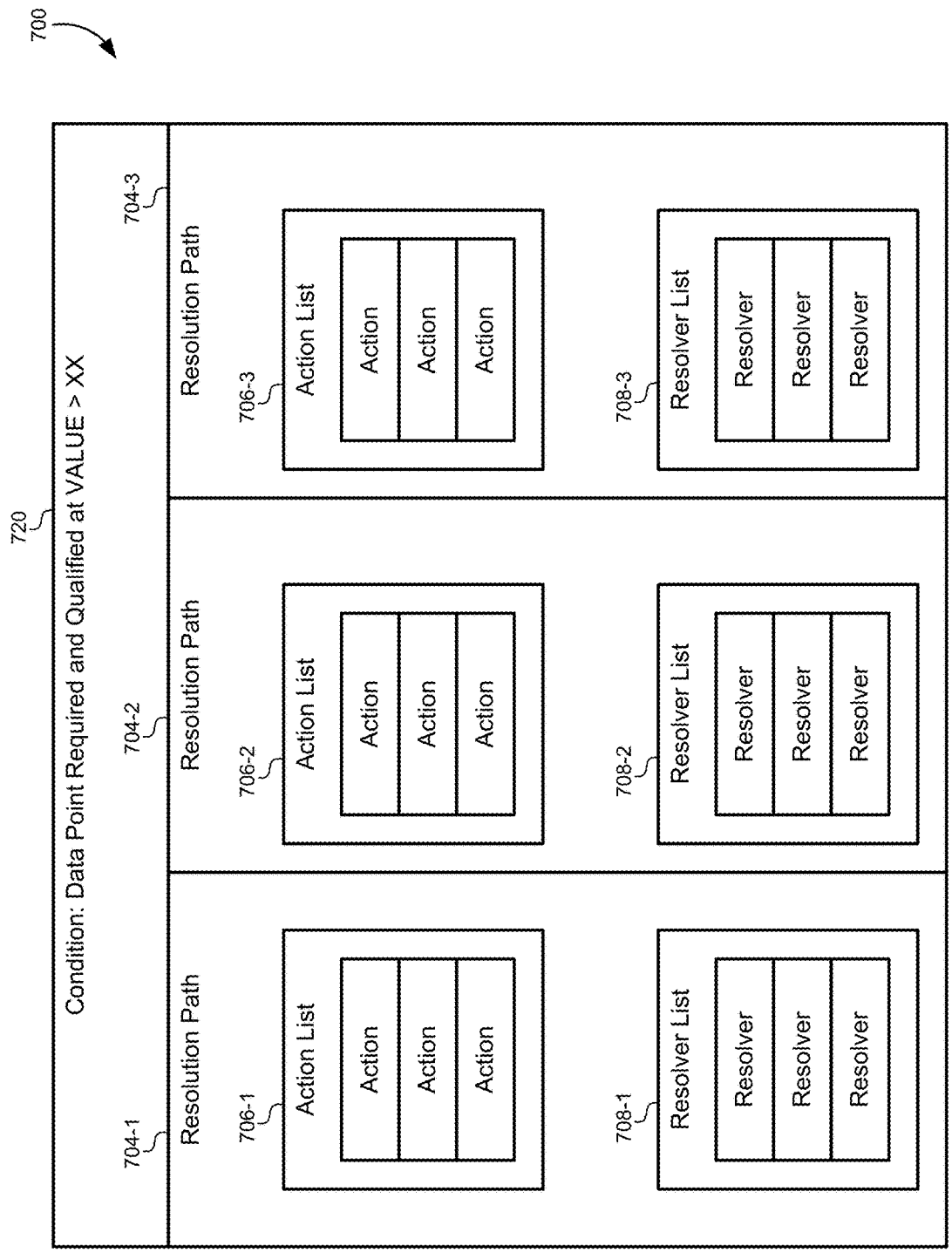
FIG. 7 illustrates a schema for a condition, according to some embodiments.

FIG. 7 illustrates a schema 700 for a condition 720, according to some embodiments. The condition 720 may include an identification of a specific data point that is required to fulfill the data set requirements 118. They may include additional information such as one or more data sources that may be acceptable, a confidence score in the data sources that may be required, and/or a value at which the data point may need to be qualified. The specific data point required, the sources required, and/or the value at which the data point may be qualified may depend on the data set requirements 118.

The condition 720 may also include one or more resolution paths 704. Each resolution path represents a different processing route that may be executed to fulfill the condition for the data point. The resolution paths 704 may include action lists 706 that may be executed by one or more of the data group services 302. Therefore, a single data point may be provided and the condition may be met through different resolution paths, each of which may be executed by different data group services. The actions may include specific instructions to be executed by the data group services as coordinated by their individual data orchestrators 402. The action lists 706 may be referred to herein as "action pathways" comprised of different actions that may be executed by specific data group services.

In addition to listing specific actions, the resolution paths 704 may include resolver lists 708. The resolver lists 708 may include specific resolvers that may be used to determine whether the actions taken in the corresponding action lists 706 have fulfilled the condition 720. For example, an action list 706-1 may include actions that request information from a user, receive a document from a specific source, extract certain fields from the document to verify that the document is authentic, and/or extract value fields from the document to populate one or more data points. The corresponding resolver list 708-1 may include resolvers that compare the fields in the document to known field values to verify the document, resolvers that compare the source of the document to a set of allowed sources, and/or resolvers that compare the values for the data points extracted from the document to threshold values to determine whether they can be qualified.

A condition schema 720 may be returned by the data group services 302 when queried by the condition service 304. The individual data group services 302 may populate the condition schema 720 with the corresponding action pathways and resolvers. For example, a schema may include a number of individual resolvers and a resolver expression that combines each of the resolvers into a single logical expression that can be evaluated to determine whether the condition has been met by the document uploaded through this particular action pathway.

Figure 8:
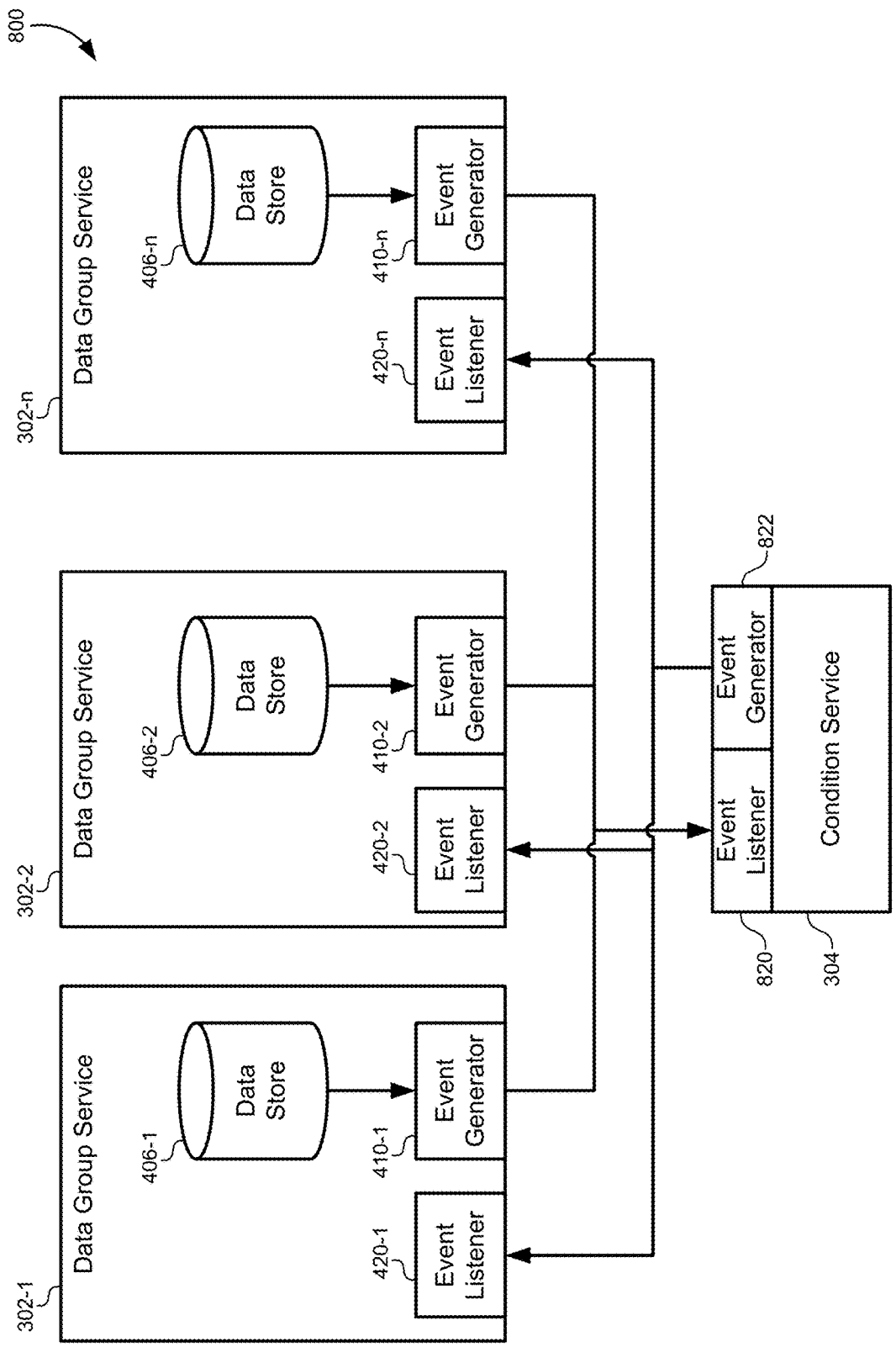
FIG. 8 illustrates a simplified block diagram of an event-listener architecture for updating the data set and/or the conditions, according to some embodiments.

FIG. 8 illustrates a simplified block diagram 800 of an event-listener architecture for updating the data set 114 and/or the conditions, according to some embodiments. This architecture allows the condition service 304 to coordinate the actions taken by the data group services 302 by updating a set of conditions that are distributed to the data group services 302. Conversely, the data group services are allowed to coordinate the update of the conditions by updating the data points stored in the distributed data set 114. The coordination in both of these directions may be accomplished using event listeners and event generators.

As described above, the data group services 302 may execute various action pathways and resolvers to resolve conditions that are provided by the condition service 304. Typically, when conditions are resolved, data points stored in the data stores 406 of the data group services 302 may be updated. When a data store 406-1 is updated with a new data point, the corresponding event generator 410-1 may generate a first type of event that indicates that at least on data point in the data set 114 that is distributed amongst the data stores 406 has changed. An event listener 820 at the condition service 304 may listen for this type of event.

In response to the first type of event indicating that the data set 114 is changed, the condition service 304 may take a number of steps to update and distribute the conditions required to complete the data set 114 in accordance with the data set requirements 118. The condition service 304 may request the individual data groups stored in the data stores 406 through the data aggregation layer 502 described above. After receiving the full data set 114, the condition service 304 may send the data set to the condition provider APIs 416 at the data group services 302. In response, the data group services 302 may provide a current set of conditions based on the current data set 114. The condition service 304 may then store the updated conditions and determine whether any conditions were changed. If any conditions were changed, the condition service 304 may generate a second type of event using an event generator 822. Each of the data group services 302 may implement event listeners 420 that listen for the second type of event indicating that the conditions have changed. The data group services 302 may examine the new set of conditions to determine whether any of the action pathways they are currently assigned have changed. For example, if a condition has been cleared and the corresponding action pathway no longer exists in the conditions, a data group service executing that action pathway may cease execution and move to a different action pathway if one exists in the conditions.

Having described the overall architecture of the system 130 and the general functionality of the system 130, the following discussion focuses on a specific example of the update loop as events are passed back and forth between the data group services and the condition service 304 to incrementally populate a data set 114.

Figure 9:
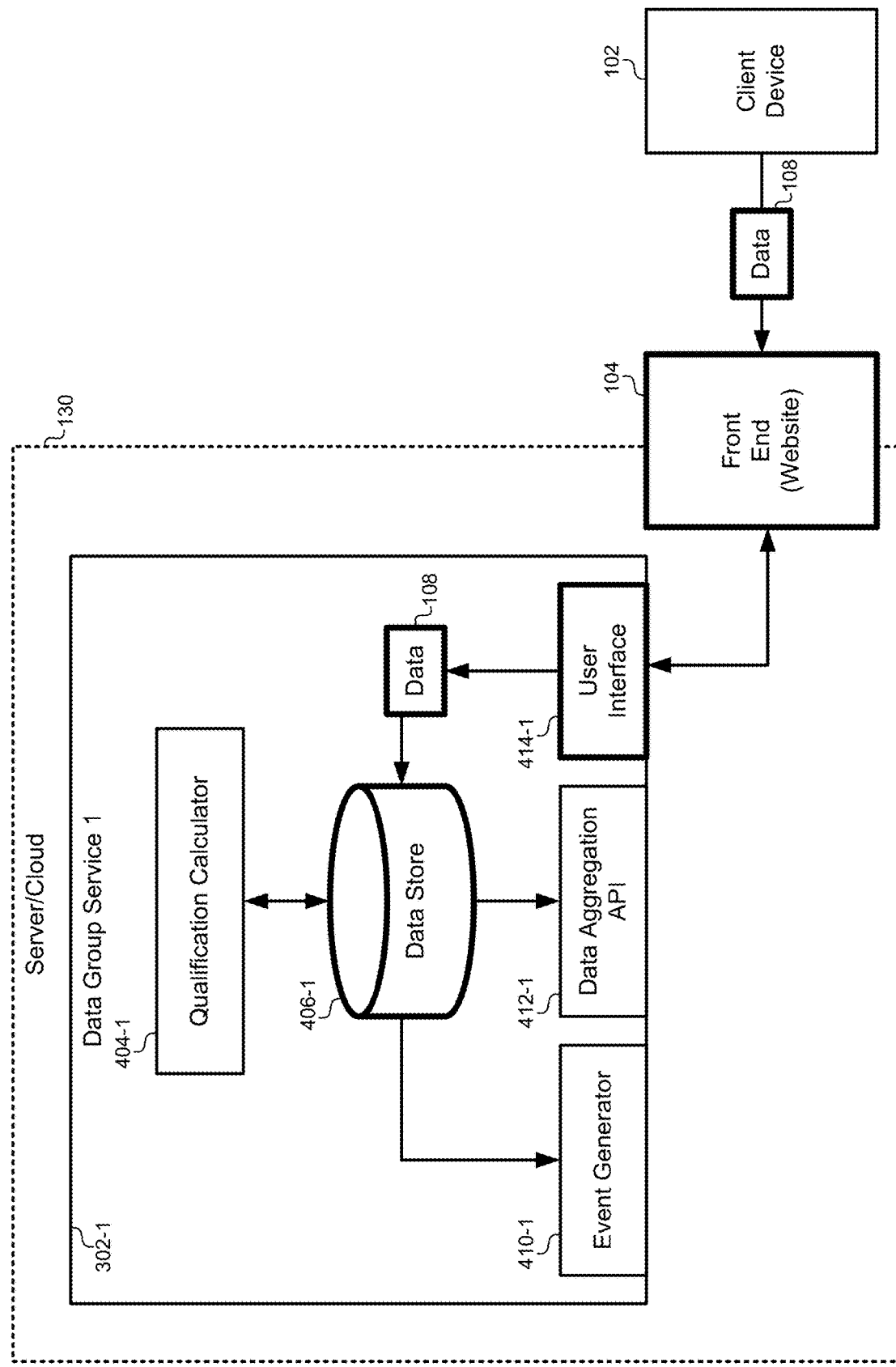
FIG. 9 illustrates how a data point may be changed in one of the distributed data stores, according to some embodiments.

FIG. 9 illustrates how a data point may be changed in one of the distributed data stores 406-1, according to some embodiments. To begin, a data group service 302-1 may receive a new data point to be added to its local data group. The data group service 302-1 may generate a user interface 414-1 that is displayed through the front end 104 of the system 130 as described with FIG. 1 above. The website 104 may present specific web forms and/or questions to the user through the client device 102 that request and retrieve data 108 indicating a user-reported value for a specific data point. The user interface 414-1 may translate the user-provided value into a data point that is stored in the data store 406-1. The user interface 414-1 provided by the data group service 302-1 may be specifically tailored to retrieve this data point because it is provided by the corresponding data group service 302-1.

Figure 10:
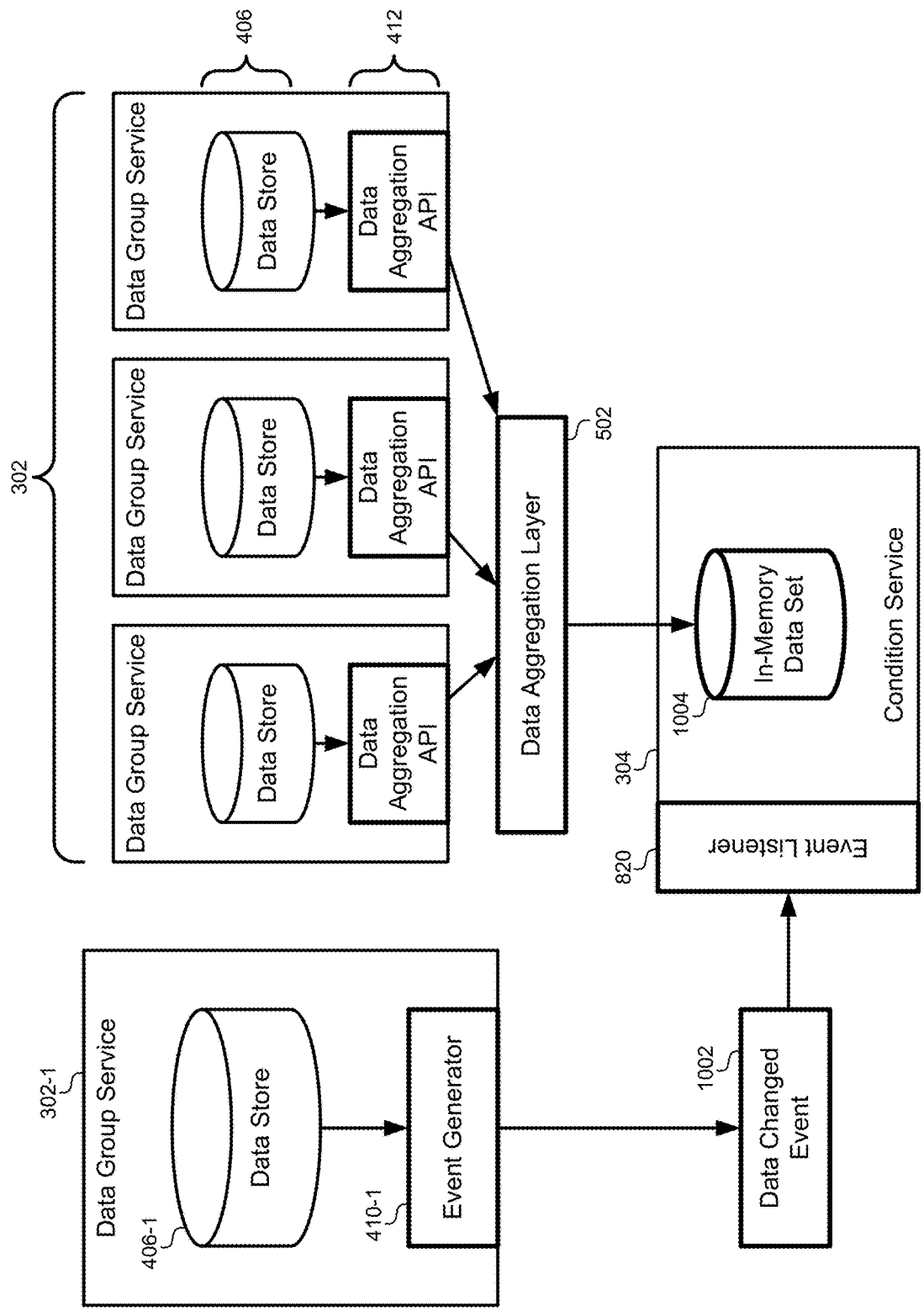
FIG. 10 illustrates how a first event may be generated when the data set is changed by one of the data group services, according to some embodiments.

FIG. 10 illustrates how a first event may be generated when the data set 114 is changed by one of the data group services 302, according to some embodiments. When the new data point received through the user interface 414-1, the new data point may be added to the data store 406-1, and the corresponding event generator 410-1 may generate an event indicating that one or more of the data points in the data store 406-1 has changed. This event may be broadcasted such that it is accessible to any of the other systems in the data collection system 112. For example, the condition service 304 may include an event listener 820 that receives the data changed event 1002 broadcasted by the data group service 302-1. The data changed event 1002 may indicate that one of the data points in the data set 114 stored collectively by the different data group services 302 has changed. In some embodiments, the data changed event 1002 may also indicate a specific data point and/or the specific data group service 302-1 that has changed the data point.

The condition service 304 may receive the data changed event 1002 and trigger a reevaluation of the current conditions in response. In order to determine whether any of the current conditions should change based on the changed data point, the condition service 304 may retrieve a full representation of the current data set 114. Using the data aggregation layer 502, the condition service 304 may send a request to each of the data aggregation APIs 412 available through each of the data group services 302. The data aggregation APIs 412 may return each of the data groups stored locally in the distributed data stores 406 by the data group services 302. The data aggregation layer 502 may combine each of these data groups into the single, cohesive data set 114, which may be passed to the condition service 304. The condition service 304 may store an in-memory version 1004 of the data set 114.

Figure 11:
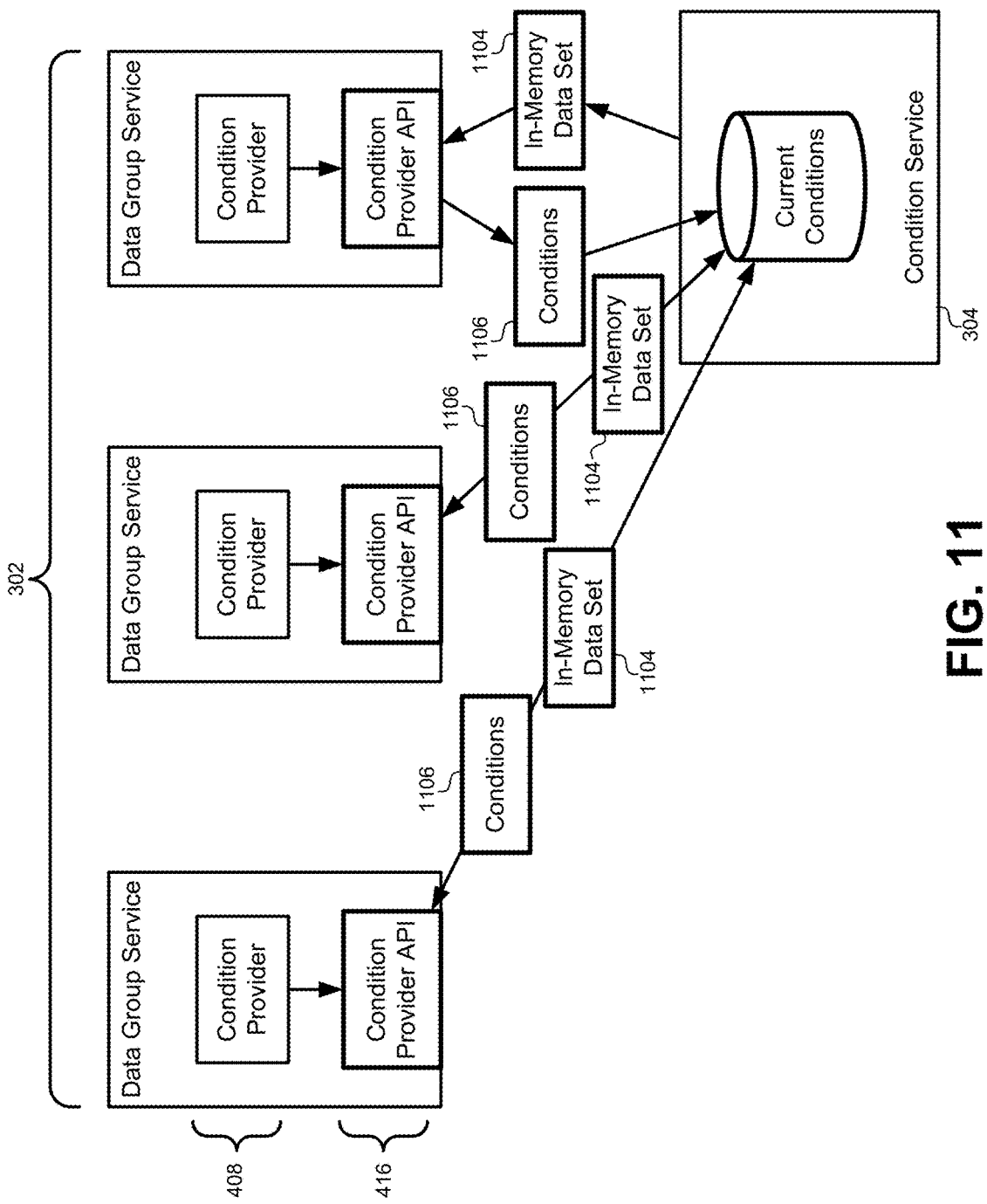
FIG. 11 illustrates how conditions may be updated through the data group services, according to some embodiments.

FIG. 11 illustrates how conditions may be updated through the data group services, according to some embodiments. Instead of storing and maintaining rule sets for generating conditions for each of the different data groups 302 at the condition service 304, the rules and functionality for generating conditions specific to each data group may be distributed to the data group services 302 themselves. Continuing with the example from FIG. 10, the condition service 304 may pass a request to provide updated conditions to each of the condition provider APIs 416 at the data group services 302. In some embodiments, the interface of the condition provider API 416 may receive a full representation of the data set 114. Because the condition service 304 has an in-memory version of the data set 114, it can pass this version 1104 to each of the condition provider APIs 416. In other embodiments, the condition provider APIs 416 may accept a subset of the data set 114 that is relevant to that particular data group service. In response, each of the condition provider APIs 416 may return an updated set of conditions 1106 to the condition service 304.

In generating a new set of conditions 1106, each of the condition providers 408 may determine whether any of the data points in the current data set 114 received from the condition service 304 affect the conditions generated by the condition provider 408. A single data point changed by one data group service may cause changes in conditions generated by one or more other data group services. Therefore, the updated conditions 1106 received from each data group service may be different, with some conditions 1106 remaining the same and some conditions 1106 changing. After receiving responses from each of the condition provider APIs 416, the condition service 304 may have a new complete set of current conditions that can replace or update the previous set of conditions.

Figure 12:
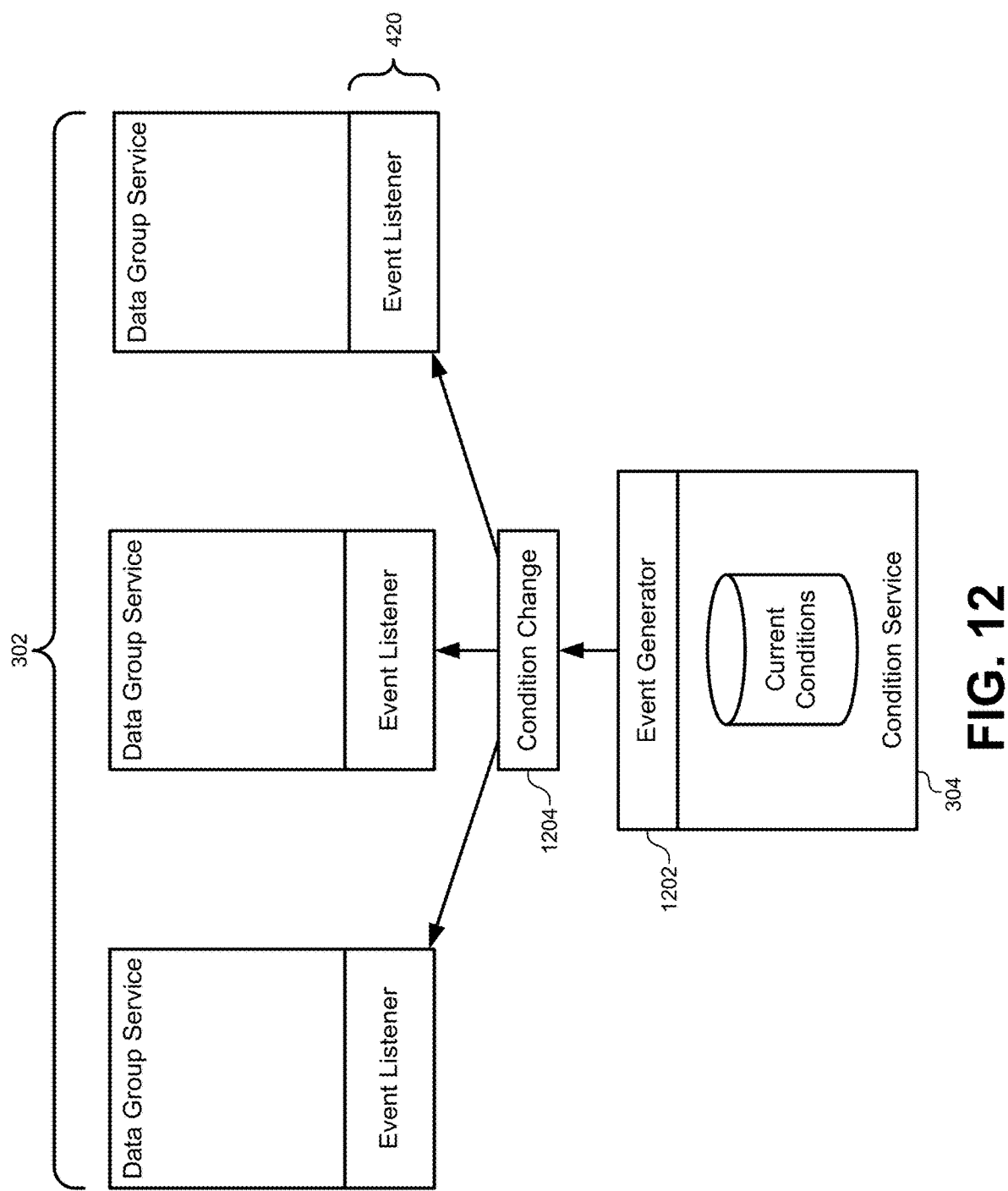
FIG. 12 illustrates how the changing conditions can generate a second event, according to some embodiments.

FIG. 12 illustrates how the changing conditions can generate a second event, according to some embodiments. The condition service 304 may compare the current conditions received from the data group services 302 and determine whether any changes have been made relative to a stored set of previous conditions maintained by the condition service 304. If any of the conditions have changed, then a second event type may be generated by the event generator 1202 of the condition service 304. The second event type may indicate that one or more of the conditions stored by the condition service 304 has changed. The condition changed event 1204 may be broadcasted to the data collection system 112. The event listeners 420 at each of the data group services 302 may receive the condition change event 1204. In some embodiments, the condition change event 1204 may include a full set of conditions that are stored at the condition service 304. Alternatively, the condition change event 1204 may notify the data group services 302 that conditions have changed, and the data group services 302 may retrieve the conditions that are relevant to that data group service from the condition service 304.

Figure 13:
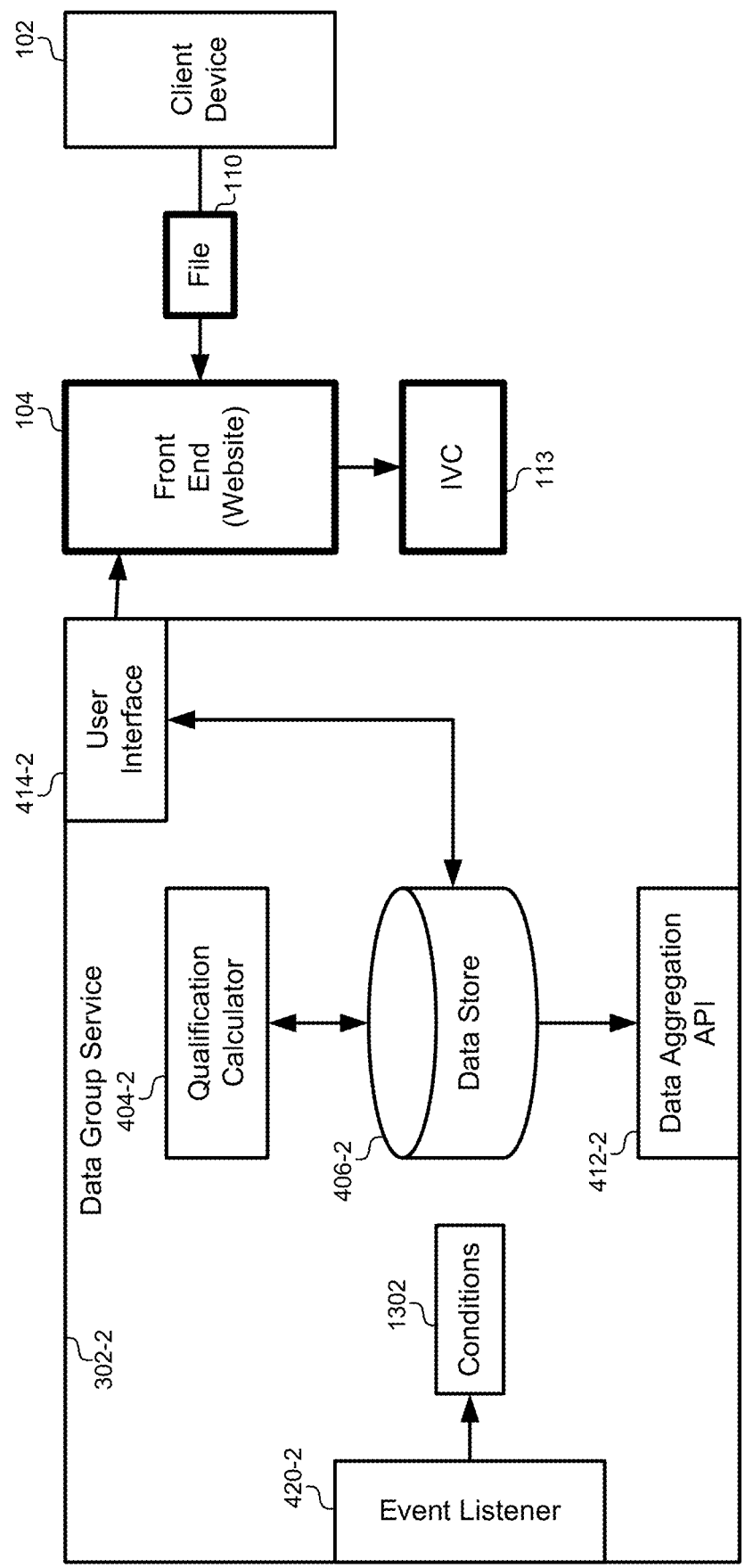
FIG. 13 illustrates how a data group service may respond to a change in conditions, according to some embodiments.

FIG. 13 illustrates how a data group service 302-2 may respond to a change in conditions, according to some embodiments. Continuing with the example above, recall that the data group service 302-1 changed the original data point that triggered the change in conditions. The changed conditions may change one of the action pathways executed by another data group service 302-2. If data group service 302-2 was previously executing a different action pathway, the change in conditions may stop the previous execution and cause data group service 302-2 to begin executing a new action pathway as dictated by the changed conditions 1302.

For example, to verify a value provided as a changed data point to data group service 302-1, data group service 302-2 may be configured to retrieve a document that verifies this value that was changed by data group service 302-1. The user interface 414-2 may present fields or controls through the front end 104 to retrieve a file 110 from the client device 102. The file 110 may be a scanned document or a digital document that verifies or provides proof that the value is correct as previously provided by the user through the client device 102. The file 110 may be passed to the IVC 113 for processing.

Figure 14:
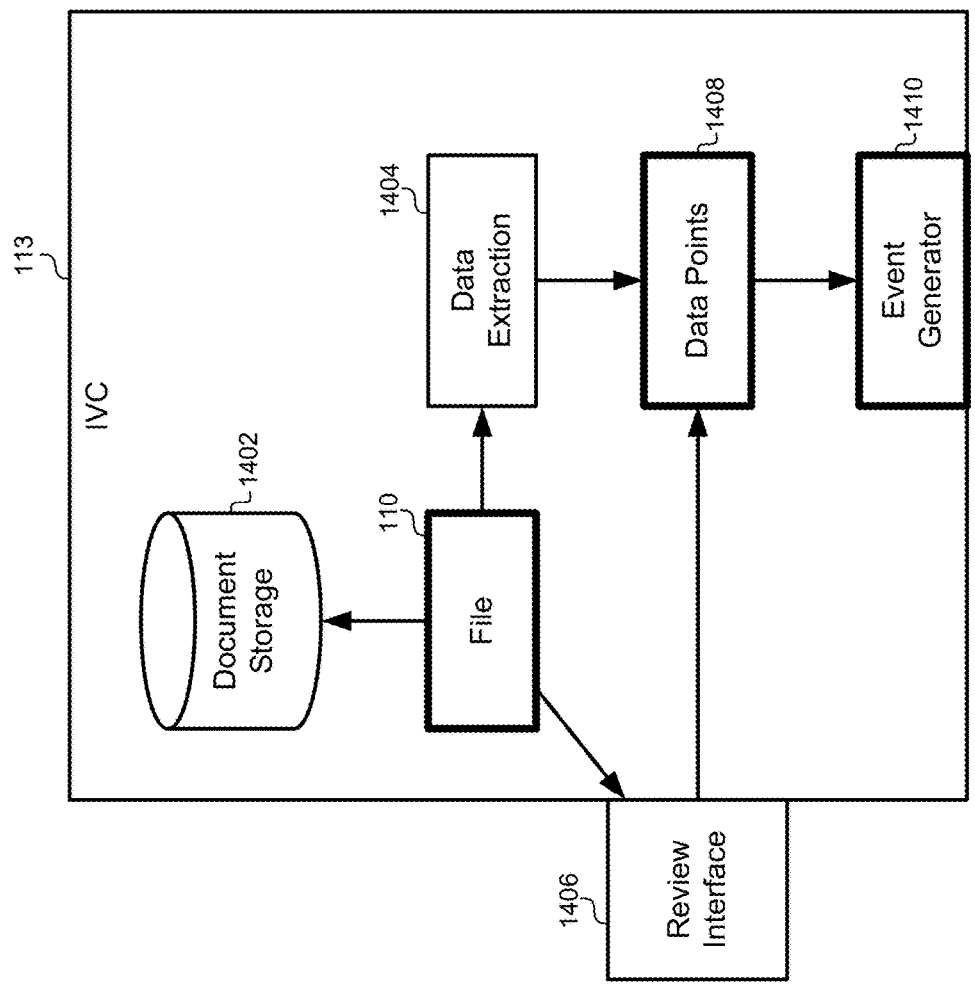
FIG. 14 illustrates a dataflow through the IVC to extract and verify fields from a file, according to some embodiments.

FIG. 14 illustrates a dataflow through the IVC 113 to extract and verify fields from a file 110, according to some embodiments. The IVC 113 may act as a general utility for the data collection system 112. Therefore, the IVC 113 may receive documents and extract values from documents for any of the data group services 302 in the data collection system 112. The IVC 113 may use OCR and/or other computer vision algorithms to identify different fields within the file 110 and translate those fields into digital values.

When the IVC 113 receives the file 110, the IVC 113 may store the file 110 in a secure document storage 1402. The secure document storage 1402 may be configured to store documents for a plurality of different users. As described above, some of the values received for the user may require specific sources to verify that the value is correct. Sources that may generate a high confidence score for these values include scans of physical documents. These documents may be stored as files 110 in the secure document storage 1402 as the data set 114 for the user is completed. In some cases, the data set requirements 118 may require that the files 110 that verify values be stored at least until after the resource is assigned to the user.

In some embodiments, two parallel paths may be executed in order to extract data points from the file 110. A first path may include a review interface 1406 that is configured to display the file 110 to a user. The user may use the review interface 1406 to visually analyze the document and ensure that it is authentic. For example, the user may view an image of a scanned document and note the location of watermarks, letterheads, logos, seals, and/or other identifying information that can be used to verify that a document is authentic. The user may also identify data points that are printed in the file 110 and enter them into the review interface 1406. The data from these fields may be stored as data points 1408 to be added to the data set 114.

A second path that may be executed in parallel with the first path may use the OCR and computer vision algorithms to perform a data extraction process 1404 that may be configured to perform the same functions that are facilitated through the review interface 1406. Specifically, the data extraction process 1404 may first identify visual markers in the file 110 (e.g., watermarks, logos, seals, etc.) that can be used to authenticate the document itself. The data extraction process 1404 may also read data fields from the file 110 and generate data points 1408 that can be added to the data set 114.

While these two execution paths may be carried out in parallel, it is not required that both execution paths be carried out to completion. For example, if the automated execution path using the data extraction process 1404 is able to authenticate the file 110 and extract all of the necessary data points 1408, then the first execution path using the review interface 1406 may be canceled. Any tasks added to a task manager to be executed by the review interface 1406 may be removed from the task manager. Conversely, if the review interface 1406 receives all of the data points 1408 prior to the data extraction process 1404 successfully identifying the data points 1408, the tasks for the data extraction process 1404 may be removed from the task manager. Thus, when one parallel execution path finishes execution, the other execution path may be discontinued to ensure that computing resources are used efficiently.

When the data points 1408 are successfully extracted from the file 110, an event generator 1410 for the IVC 113 may be triggered to generate an event indicating that the data points 1408 have been successfully extracted from the file 110. The event listeners of the data group services 302 may listen for this event and determine whether any of the data points 1408 should be stored in their respective distributed data stores. This allows the IVC 113 to provide data points for any of the data group services 302.

Figure 15:
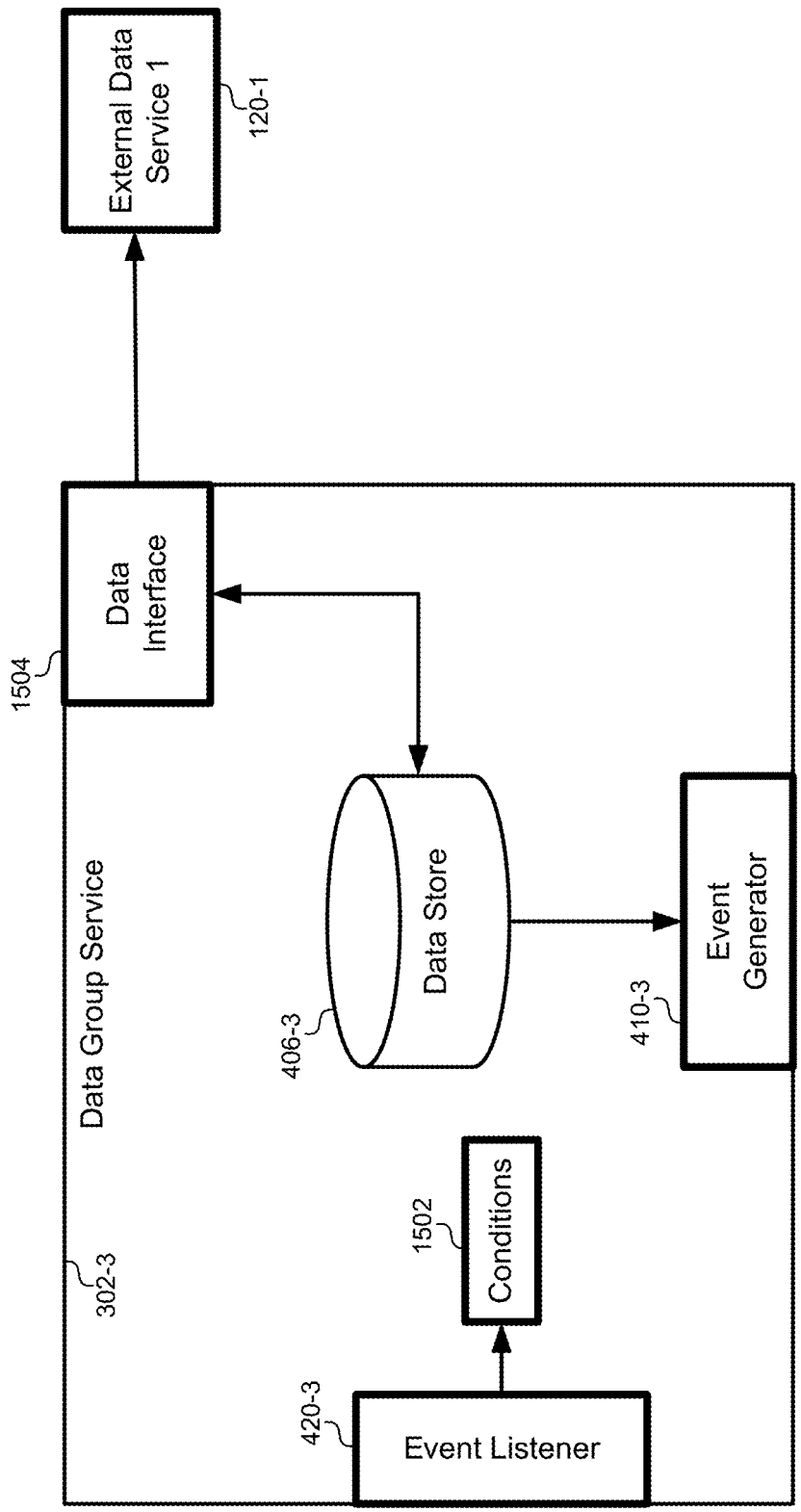
FIG. 15 illustrates how multiple action paths may be executed in parallel by different data group services to clear the same conditions, according to some embodiments.

FIG. 15 illustrates how multiple action paths may be executed in parallel by different data group services to clear the same conditions, according to some embodiments. In FIG. 14, data points were received and validated by receiving a document through a user interface from a user. As described above, each of the conditions may describe a number of different action pathways that may be executed in parallel, each of which may provide and/or verify the same data points. When one of these action pathways is executed successfully, the condition may be cleared, and the new set of conditions may cancel the other action pathways being executed in parallel.

In this example, another data group service 302-3 may execute a second action pathway that is configured to receive and verify the same values as the file 110 described in FIG. 14. Specifically, data group service 302-3 may include a data interface 1504 that interacts with external data service 120-1. External data service 120-1 may be configured to provide one of the data points for the data set 114. Because external data service 120-1 is a trusted source, the data points received from external data service 120-1 may be considered verified without further documentation or sources.

When the data points are received through the data interface 1504, they may be stored in the data store 406-3 for data group service 302-3. In other instances, the data group service 302-3 may generate an event indicating that a data point was received from external data service 120-1, and the data point may be broadcasted to other data group services 302. This allows data group service 302-3 to act as an interface to external data service 120-1 such that data points retrieved from external data service 120-1 may be broadcasted and stored in other data group services 302 configured to specifically store those data points.

Assuming that data group service 302-3 is assigned to store data points from external data service 120-1 in its local distributed data store 406-3, data group service 302-3 may generate another event of the first type indicating that one or more data points in the data set 114 have changed through its event generator 410-3. At this point, the update loop described above may restart and continue execution at the condition service 304. Specifically, the condition service 304 may generate a new set of conditions, and if these conditions have changed, the condition service 304 may broadcast the second type of event indicating that the conditions have changed. The event listeners 420 for each of the data group services 302 may listen for the condition changed event and evaluate any new conditions 1502 to determine whether to continue executing existing action pathways or to begin executing new action pathways. For example, if the IVC 113 retrieved and validated a data point also being retrieved from external data service 120-1, the new conditions 1502 would remove the action pathway to retrieve and verify this data point from data group service 302-3 and allow data group service 302-3 to begin executing action pathways for other data points.

Figure 16:
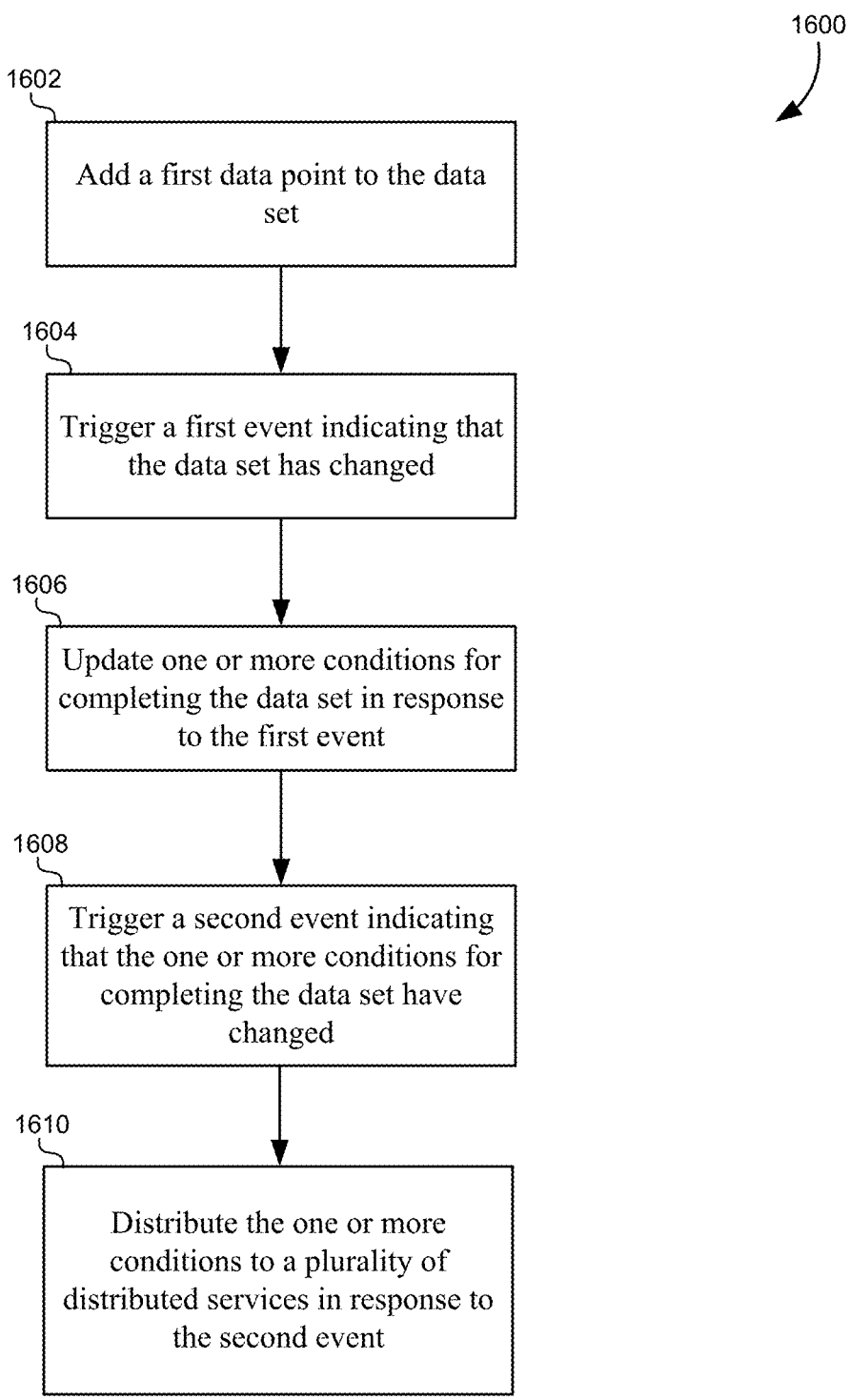
FIG. 16 illustrates a flowchart of a method for updating a data set using event-based conditions, according to some embodiments.

FIG. 16 illustrates a flowchart 1600 of a method for updating a data set using event-based conditions, according to some embodiments. The method may include adding a first data point to a data set (1602). The data set may be assigned to a specific user. A portion of the data set may be used before it is completed to select a resource for the user. The resource may dictate a specific set of data set requirements that may be used to populate the remainder of the data set. The first data point may be received from an external data service through a web interface. Alternatively, the first data point may be received through a user interface. The user interface may be generated by a distributed service, such as the data group services described above. The data set may also be subdivided into a plurality of data groups. Each data group may be assigned to a corresponding distributed service, such as one of the data group services described above. The distributed services may include local data stores that store their corresponding data groups. This step may be executed as described throughout this disclosure, including in relation to FIGS. 1, 2, 5, 9, 15, and elsewhere.

The method may also include triggering a first event indicating that the data set has changed (1604). Adding the first data point to the data set may trigger this first event. The first event may be broadcasted from one of the distributed services to other distributed services and to a condition service that manages a set of one or more conditions. The first event may indicate a portion of the data set that has changed. This step may be executed as described throughout this disclosure, including in relation to FIGS. 4, 8, 10, and elsewhere.

The method may additionally include updating one or more conditions for completing the data set (1606). The conditions may be updated in response to receiving the first event. The conditions may be determined based at least in part on a set of data set requirements corresponding to a resource selected for the data set. The conditions may be associated with action pathways for receiving or verifying missing data points in the data set. These action pathways may be indicated in a standardized schema for defining each of the conditions. To generate the conditions, a condition service may request each of the data groups from the distributed services through a data aggregation layer such that a full version of the data set is available at the condition service. The data set may be transmitted to each of the distributed services, and the conditions may be generated by the distributed services themselves and transmitted back to the condition service. This step may be executed as described throughout this disclosure, including in relation to FIGS. 6, 7, 11, and elsewhere.

The method may further include triggering a second event indicating that the one or more conditions for completing the data set have changed (1608). For example, the condition service may compare the new set of conditions to an existing set of conditions and determine whether any of the conditions have changed. If the conditions have changed, this second event may be broadcasted to each of the distributed services. The second event may include the new set of conditions or may include only conditions that have changed since a previous event of this type was triggered. This step may be executed as described throughout this disclosure, including in relation to FIGS. 8, 12, and elsewhere.

The method may also include distributing the one or more conditions to a plurality of distributed services (1610). The conditions may be distributed as part of broadcasting the second event. These conditions may also be distributed in response to the second event. Each of the distributed services may be configured to execute one or more of the action pathways for receiving or verifying the missing data points in the data set. The distributed services may correspond to the data group services described above. Receiving an indication of a new action pathway may stop execution of a previous action pathway such that the new action pathway may be executed. An action pathway may include a set of discrete steps that should be executed by the distributed service. Action pathway may alternatively include an indication that the distributed service should acquire a specific data point using a specific method. This step may be executed as described throughout this disclosure, including in relation to FIGS. 4, 7, 8, 12-15, and elsewhere.

It should be appreciated that the specific steps illustrated in FIG. 16 provide particular methods of updating data sets incrementally using event-based conditions according to various embodiments. Other sequences of steps may also be performed according to alternative embodiments. For example, alternative embodiments may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 17:
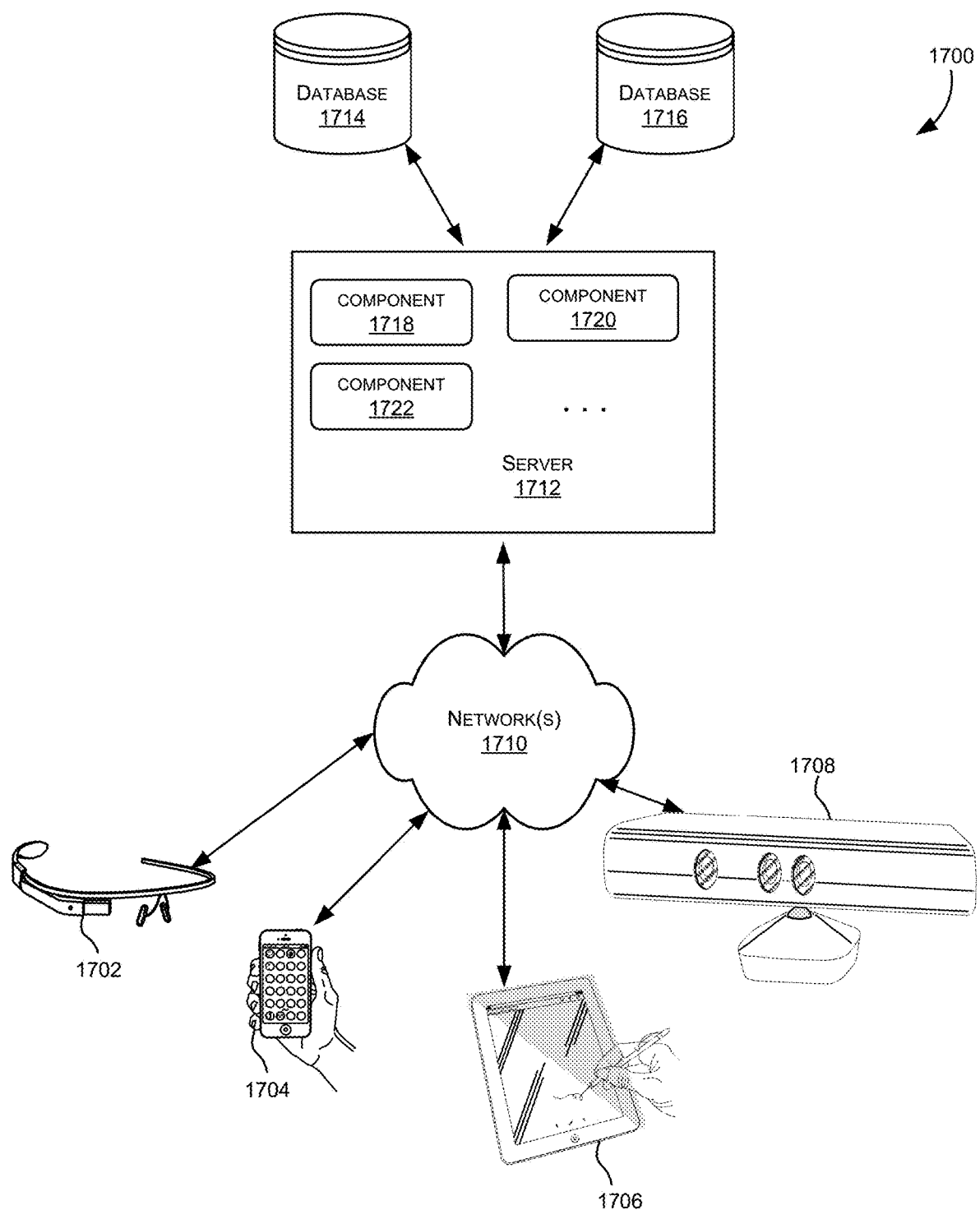
FIG. 17 illustrates a simplified block diagram of a distributed system for implementing some of the embodiments.

FIG. 17 depicts a simplified diagram of a distributed system 1700 for implementing one of the embodiments. In the illustrated embodiment, distributed system 1700 includes one or more client computing devices 1702, 1704, 1706, and 1708, which are configured to execute and operate a client application such as a web browser, proprietary client, or the like over one or more network(s) 1710. Server 1712 may be communicatively coupled with remote client computing devices 1702, 1704, 1706, and 1708 via network 1710.

In various embodiments, server 1712 may be adapted to run one or more services or software applications provided by one or more of the components of the system. In some embodiments, these services may be offered as web-based or cloud services or under a Software as a Service (SaaS) model to the users of client computing devices 1702, 1704, 1706, and/or 1708. Users operating client computing devices 1702, 1704, 1706, and/or 1708 may in turn utilize one or more client applications to interact with server 1712 to utilize the services provided by these components.

In the configuration depicted in the figure, the software components 1718, 1720 and 1722 of system 1700 are shown as being implemented on server 1712. In other embodiments, one or more of the components of system 1700 and/or the services provided by these components may also be implemented by one or more of the client computing devices 1702, 1704, 1706, and/or 1708. Users operating the client computing devices may then utilize one or more client applications to use the services provided by these components. These components may be implemented in hardware, firmware, software, or combinations thereof. It should be appreciated that various different system configurations are possible, which may be different from distributed system 1700. The embodiment shown in the figure is thus one example of a distributed system for implementing an embodiment system and is not intended to be limiting.

Client computing devices 1702, 1704, 1706, and/or 1708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1702, 1704, 1706, and 1708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1710.

Although exemplary distributed system 1700 is shown with four client computing devices, any number of client computing devices may be supported. Other devices, such as devices with sensors, etc., may interact with server 1712.

Network(s) 1710 in distributed system 1700 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1710 can be a local area network (LAN), such as one based on Ethernet, Token-Ring and/or the like. Network(s) 1710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1712 may be adapted to run one or more services or software applications described in the foregoing disclosure. For example, server 1712 may correspond to a server for performing processing described above according to an embodiment of the present disclosure.

Server 1712 may run an operating system including any of those discussed above, as well as any commercially available server operating system. Server 1712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1712 may include one or more applications to analyze and consolidate data feeds and/or event updates received from users of client computing devices 1702, 1704, 1706, and 1708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1712 may also include one or more applications to display the data feeds and/or real-time events via one or more display devices of client computing devices 1702, 1704, 1706, and 1708.

Distributed system 1700 may also include one or more databases 1714 and 1716. Databases 1714 and 1716 may reside in a variety of locations. By way of example, one or more of databases 1714 and 1716 may reside on a non-transitory storage medium local to (and/or resident in) server 1712. Alternatively, databases 1714 and 1716 may be remote from server 1712 and in communication with server 1712 via a network-based or dedicated connection. In one set of embodiments, databases 1714 and 1716 may reside in a storage-area network (SAN). Similarly, any necessary files for performing the functions attributed to server 1712 may be stored locally on server 1712 and/or remotely, as appropriate. In one set of embodiments, databases 1714 and 1716 may include relational databases that are adapted to store, update, and retrieve data in response to SQL-formatted commands.

Figure 18:
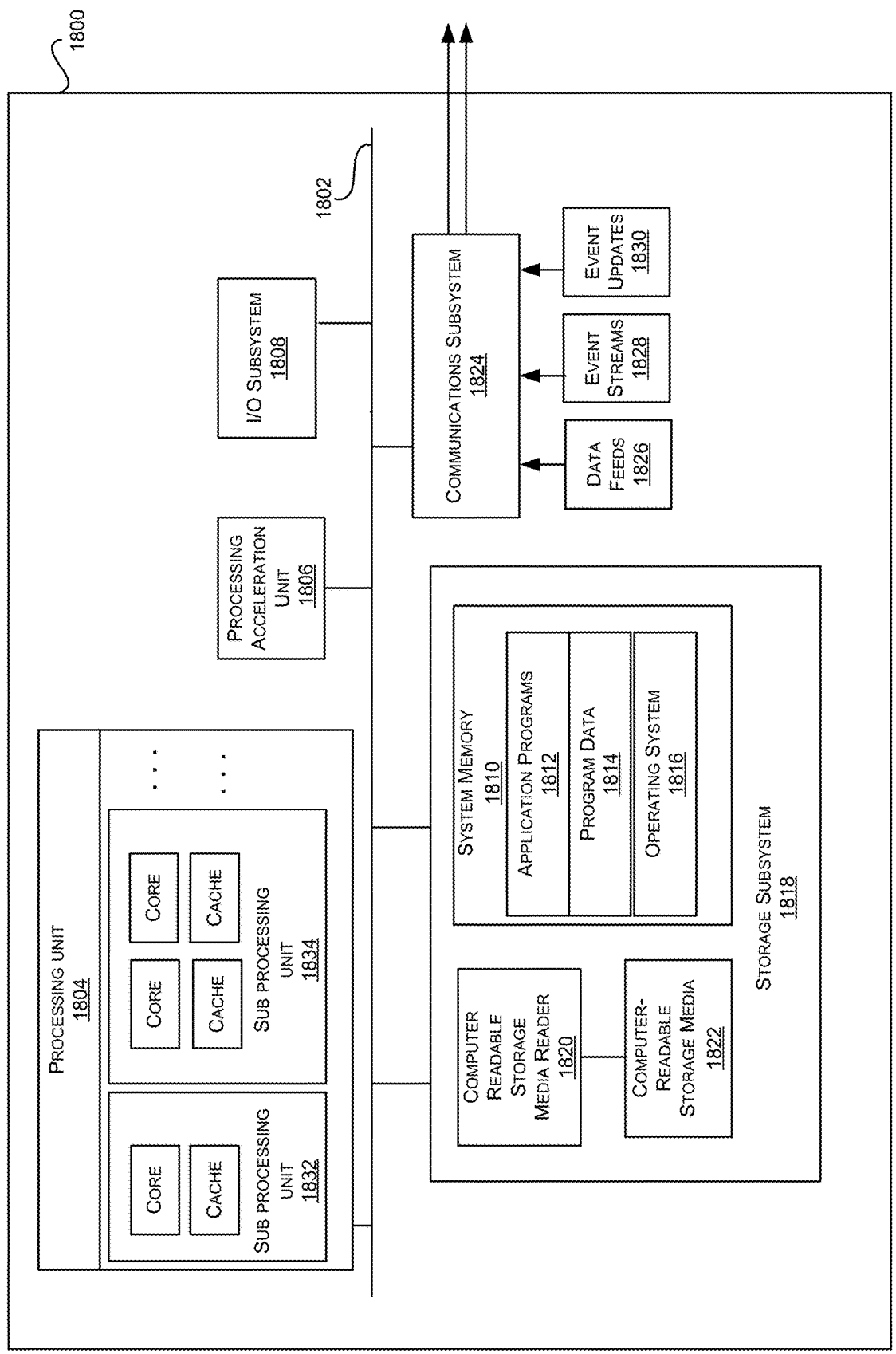
FIG. 18 illustrates an exemplary computer system, in which various embodiments may be implemented.

FIG. 18 illustrates an exemplary computer system 1800, in which various embodiments may be implemented. The system 1800 may be used to implement any of the computer systems described above. As shown in the figure, computer system 1800 includes a processing unit 1804 that communicates with a number of peripheral subsystems via a bus subsystem 1802. These peripheral subsystems may include a processing acceleration unit 1806, an I/O subsystem 1808, a storage subsystem 1818 and a communications subsystem 1824. Storage subsystem 1818 includes tangible computer-readable storage media 1822 and a system memory 1810.

Bus subsystem 1802 provides a mechanism for letting the various components and subsystems of computer system 1800 communicate with each other as intended. Although bus subsystem 1802 is shown schematically as a single bus, alternative embodiments of the bus subsystem may utilize multiple buses. Bus subsystem 1802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1804, which can be implemented as one or more integrated circuits (e.g., a conventional microprocessor or microcontroller), controls the operation of computer system 1800. One or more processors may be included in processing unit 1804. These processors may include single core or multicore processors. In certain embodiments, processing unit 1804 may be implemented as one or more independent processing units 1832 and/or 1834 with single or multicore processors included in each processing unit. In other embodiments, processing unit 1804 may also be implemented as a quad-core processing unit formed by integrating two dual-core processors into a single chip.

In various embodiments, processing unit 1804 can execute a variety of programs in response to program code and can maintain multiple concurrently executing programs or processes. At any given time, some or all of the program code to be executed can be resident in processor(s) 1804 and/or in storage subsystem 1818. Through suitable programming, processor(s) 1804 can provide various functionalities described above. Computer system 1800 may additionally include a processing acceleration unit 1806, which can include a digital signal processor (DSP), a special-purpose processor, and/or the like.

I/O subsystem 1808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1800 may comprise a storage subsystem 1818 that comprises software elements, shown as being currently located within a system memory 1810. System memory 1810 may store program instructions that are loadable and executable on processing unit 1804, as well as data generated during the execution of these programs.

Depending on the configuration and type of computer system 1800, system memory 1810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1804. In some implementations, system memory 1810 may include multiple different types of memory, such as static random access memory (SRAM) or dynamic random access memory (DRAM). In some implementations, a basic input/output system (BIOS), containing the basic routines that help to transfer information between elements within computer system 1800, such as during start-up, may typically be stored in the ROM. By way of example, and not limitation, system memory 1810 also illustrates application programs 1812, which may include client applications, Web browsers, mid-tier applications, relational database management systems (RDBMS), etc., program data 1814, and an operating system 1816. By way of example, operating system 1816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1818 may also provide a tangible computer-readable storage medium for storing the basic programming and data constructs that provide the functionality of some embodiments. Software (programs, code modules, instructions) that when executed by a processor provide the functionality described above may be stored in storage subsystem 1818. These software modules or instructions may be executed by processing unit 1804. Storage subsystem 1818 may also provide a repository for storing data used in accordance with some embodiments.

Storage subsystem 1800 may also include a computer-readable storage media reader 1820 that can further be connected to computer-readable storage media 1822. Together and, optionally, in combination with system memory 1810, computer-readable storage media 1822 may comprehensively represent remote, local, fixed, and/or removable storage devices plus storage media for temporarily and/or more permanently containing, storing, transmitting, and retrieving computer-readable information.

Computer-readable storage media 1822 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1800.

By way of example, computer-readable storage media 1822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1822 may include, but is not limited to, Zip® drives, flash memory cards, universal serial bus (USB) flash drives, secure digital (SD) cards, DVD disks, digital video tape, and the like. Computer-readable storage media 1822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1800.

Communications subsystem 1824 provides an interface to other computer systems and networks. Communications subsystem 1824 serves as an interface for receiving data from and transmitting data to other systems from computer system 1800. For example, communications subsystem 1824 may enable computer system 1800 to connect to one or more devices via the Internet. In some embodiments communications subsystem 1824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1824 can provide wired network connectivity (e.g., Ethernet) in addition to or instead of a wireless interface.

In some embodiments, communications subsystem 1824 may also receive input communication in the form of structured and/or unstructured data feeds 1826, event streams 1828, event updates 1830, and the like on behalf of one or more users who may use computer system 1800.

By way of example, communications subsystem 1824 may be configured to receive data feeds 1826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1824 may also be configured to receive data in the form of continuous data streams, which may include event streams 1828 of real-time events and/or event updates 1830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1824 may also be configured to output the structured and/or unstructured data feeds 1826, event streams 1828, event updates 1830, and the like to one or more databases that may be in communication with one or more streaming data source computers coupled to computer system 1800.

Computer system 1800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of updating data sets using event-based conditions, the method comprising:
    adding or verifying a first data point in a data set, wherein the data set comprises data that is associated with a user application, and the data set still has missing or unverified data points after adding or verifying the first data point;
    triggering a first event indicating that the data set has changed, wherein adding the first data point to the data set triggers the first event;
    in response to the first event, updating one or more conditions for completing the data set, wherein the one or more conditions are associated with a plurality of action pathways for receiving the missing data points or verifying the unverified data points in the data set;
    triggering a second event indicating that the one or more conditions for completing the data set have changed; and
    in response to the second event, causing a plurality of distributed services to each execute one or more of the action pathways for receiving the missing data points or verifying the unverified data points in the data set.

2. The method of claim 1, further comprising:
    receiving the first data point from an external data service through a web interface.

3. The method of claim 1, further comprising:
    receiving the first data point through a user interface that is generated by a distributed service that is assigned to the first data point in the data set.

4. The method of claim 1, wherein the one or more conditions are based at least in part on a set of data set requirements that are associated with the user application, wherein fulfilling the one or more conditions allows the user application to be completed.

5. The method of claim 4, wherein the user application is for a mortgage product or service.

6. The method of claim 1, wherein the data set is subdivided into a plurality of data groups, and each data group in the plurality of data groups is assigned to a corresponding distributed service in the plurality of distributed services.

7. The method of claim 6, wherein each of the plurality of data groups are stored locally by the corresponding distributed service in the plurality of distributed services, wherein the data set is distributed among the plurality of distributed services.

8. The method of claim 7, further comprising:
    sending a request through a data aggregation layer to the plurality of distributed services for the plurality of data groups; and
    receiving the plurality of data groups from the plurality of distributed services and assembling the data set from the plurality of data groups.

9. The method of claim 1, wherein an indication of a corresponding source is stored for each data point in the data set.

10. The method of claim 1, further comprising:
    generating a second data point in the data set using a qualification calculator that performs an operation using a plurality of data points in the data set as operands to qualify the user for a mortgage product or service.

11. The method of claim 1, wherein the first data point is added to the data set by a first distributed service in the plurality of distributed services.

12. The method of claim 11, wherein the first event is generated by the first distributed service.

13. The method of claim 12, wherein a condition service receives the first event, updates the one or more conditions, and generates the second event.

14. The method of claim 13, further comprising:
    receiving the second event by a second distributed service in the plurality of distributed services;
    executing an action pathway associated with the one or more conditions;
    adding a second data point to the data set; and
    generating another instance of the first event indicating that the data set has changed.

15. The method of claim 1, further comprising:
    registering a first distributed service with a condition service using a standardized interface between the condition service and the plurality of distributed services, wherein the first distributed service is added to the plurality of distributed services.

16. The method of claim 1, wherein portions of the one or more conditions are generated by the plurality of distributed services and combined to form the one or more conditions.

17. The method of claim 1, wherein the one or more conditions are associated with one or more resolvers that include logical operations to determine whether the one or more conditions have been fulfilled.

18. The method of claim 1, wherein the first data point is extracted from a document file uploaded from a client device.

19. A non-transitory computer-readable medium comprising instructions that, when executed by one or more processors, cause the one or more processors to perform operations comprising:

adding a first data point to a data set, wherein the data set comprises data that is descriptive of a user, and the data set still has missing data points after adding the first data point;

triggering a first event indicating that the data set has changed, wherein adding the first data point to the data set triggers the first event;

in response to the first event, updating one or more conditions for completing the data set, wherein the one or more conditions are associated with a plurality of action pathways for receiving or verifying the missing data points in the data set;

triggering a second event indicating that the one or more conditions for completing the data set have changed; and in response to the second event, distributing the one or more conditions to a plurality of distributed services, wherein each of the plurality of distributed services is configured to execute one or more of the action pathways for receiving or verifying the missing data points in the data set.

20. A system comprising:

one or more processors; and one or more memories comprising instructions that, when executed by the one or more processors, cause the one or more processors to perform operations comprising:

adding a first data point to a data set, wherein the data set comprises data that is descriptive of a user, and the data set still has missing data points after adding the first data point;

triggering a first event indicating that the data set has changed, wherein adding the first data point to the data set triggers the first event;

in response to the first event, updating one or more conditions for completing the data set, wherein the one or more conditions are associated with a plurality of action pathways for receiving or verifying the missing data points in the data set;

triggering a second event indicating that the one or more conditions for completing the data set have changed; and in response to the second event, distributing the one or more conditions to a plurality of distributed services, wherein each of the plurality of distributed services is configured to execute one or more of the action pathways for receiving or verifying the missing data points in the data set.

* * * * *